United States Patent
Ito et al.

(10) Patent No.: US 12,535,483 B2
(45) Date of Patent: Jan. 27, 2026

(54) NOROVIRUS-BINDING PEPTIDE

(71) Applicant: Kao Corporation, Tokyo (JP)

(72) Inventors: Yoshitaka Ito, Sakura (JP); Takuya Morimoto, Tokyo (JP); Shigefumi Kumachi, Saitama (JP); Naoto Nemoto, Saitama (JP)

(73) Assignee: Kao Corporation, Tokyo (JP)

( * ) Notice: Subject to any disclaimer, the term of this patent is extended or adjusted under 35 U.S.C. 154(b) by 1102 days.

(21) Appl. No.: 17/613,310

(22) PCT Filed: May 28, 2020

(86) PCT No.: PCT/JP2020/021238
§ 371 (c)(1),
(2) Date: Nov. 22, 2021

(87) PCT Pub. No.: WO2020/241799
PCT Pub. Date: Dec. 3, 2020

(65) Prior Publication Data
US 2022/0229058 A1    Jul. 21, 2022

(30) Foreign Application Priority Data

May 29, 2019   (JP) ................ 2019-100757

(51) Int. Cl.
*C07K 7/06* (2006.01)
*G01N 33/569* (2006.01)

(52) U.S. Cl.
CPC ......... *G01N 33/56983* (2013.01); *C07K 7/06* (2013.01)

(58) Field of Classification Search
None
See application file for complete search history.

(56) References Cited

U.S. PATENT DOCUMENTS

2016/0061835 A1   3/2016  Palzkill et al.
2016/0209421 A1   7/2016  Suga

FOREIGN PATENT DOCUMENTS

| JP | 2016-123343 A | 7/2016 |
|----|---------------|--------|
| JP | 2019-043946 A | 3/2019 |
| JP | 2020-196706 A | 12/2020 |
| JP | 2020-196708 A | 12/2020 |

OTHER PUBLICATIONS

Wang et al (Genome Biol 12: 1-14, 2011).*
Wang et al (Biotech Adv 36: 894-904, 2018).*
The extended European search report including the supplementary European search report and the European search opinion, for EP Application No. 20813028.6-1118, dated Jun. 16, 2023, from the European Patent Office, Munich, Germany.
International Search Report for PCT/JP2020/021238; I.A. fd May 28, 2020, mailed Aug. 18, 2020, the Japan Patent Office, Tokyo, Japan.
International Preliminary Report on Patentability (IPRP), Chapter I of the Patent Cooperation Treaty, including the Written Opinion, for PCT/JP2020/021238; I.A. fd May 28, 2020, issued Nov. 16, 2021, by the International Bureau of WIPO, Geneva, Switzerland.
Hwang, HJ et al., "High sensitive and selective electrochemical biosensor: Label-free detection of human norovirus using affinity peptide as molecular binder," Biosens Bioelectron. Jan. 15, 2017;87:164-170. doi: 10.1016/j.bios.2016.08.031. Epub Aug. 12, 2016. PMID: 27551996.
Hwang, HJ et al., "Identification of high affinity peptides for capturing norovirus capsid proteins," RSC Adv. (2015) 5:55300-55302, first published Jun. 18, 2015.
Yamaguchi, J et al., "cDNA display: a novel screening method for functional disulfide-rich peptides by solid-phase synthesis and stabilization of mRNA-protein fusions," Nucleic Acids Res. Sep. 2009;37(16):e108. doi: 10.1093/nar/gkp514. Epub Jun. 15, 2009. PMID: 19528071; PMCID: PMC2760808.

* cited by examiner

*Primary Examiner* — Gregory S Emch
*Assistant Examiner* — Aditi Dutt
(74) *Attorney, Agent, or Firm* — Sterne, Kessler, Goldstein & Fox P.L.L.C.

(57) ABSTRACT

Provided is a peptide that specifically binds to norovirus, which is useful for detection and infection control of norovirus. A norovirus-binding peptide consisting of an amino acid sequence selected from the group consisting of SEQ ID NOs: 1 to 185.

8 Claims, 4 Drawing Sheets
Specification includes a Sequence Listing.

NOROVIRUS-BINDING PEPTIDE

FIELD OF THE INVENTION

The present invention relates to a norovirus-binding peptide having affinity to norovirus.

BACKGROUND OF THE INVENTION

Norovirus is a virus that has been called SRSV (Small Round Structured Virus) and also called NLV (Norwalk-like virus), and is classified into five categories from GI (genogroup I) to GV (genogroup V) based on the genotypes, among which GI, GII, and GIV infect humans. Norovirus is a virus that propagates in human intestinal cells and causes food poisoning with symptoms such as diarrhea, vomiting, abdominal pain, nausea, and fever. The main source of infection is food, and raw oysters are often a problem. In addition, in recent years, human to human transmission through excrement etc. of a virus carrier is also increasing.

Currently, as the detection of norovirus, in addition to observation with an electron microscope, there are a method using an antibody and a method of measuring the amount of an amplification product of norovirus RNA. Furthermore, recently, a polypeptide consisting of 18 amino acids that has affinity to norovirus and is useful for detection of norovirus has also been found, but it has been reported that the bonding strength is low compared to previously reported norovirus antibodies (Non Patent Literature 1).

However, a method for detecting RNA requires reverse transcription and an amplification step, and the operation is complicated and takes time and cost. Antibodies also have problems: the specificity is low in some cases; and since animals or culture cells are used for producing and manufacturing antibodies, the quality is unstable and the cost is high.

Accordingly, there is a demand for developing a more effective and simpler norovirus-specific detection method and a prophylactic and therapeutic method for norovirus infection.

Non Patent Literature 1

Hye Jin Hwang, et al., Biosensors and Bioelectronics, 2017, 87, 164-170

SUMMARY OF THE INVENTION

The present invention relates to the following 1) to 4):
1) a norovirus-binding peptide consisting of an amino acid sequence selected from the group consisting of SEQ ID NOs: 1 to 185;
2) a norovirus-binding peptide consisting of an amino acid sequence selected from the group consisting of SEQ ID NOS: 1 to 185 with a cysteine residue added to either or both of an N-terminus and a C-terminus thereof;
3) a method for detecting norovirus comprising using the norovirus-binding peptide of the above 1) or 2); and
4) a norovirus detection kit comprising the norovirus-binding peptide of the above 1) or 2).

DETAILED DESCRIPTION OF THE INVENTION

Figure 1:
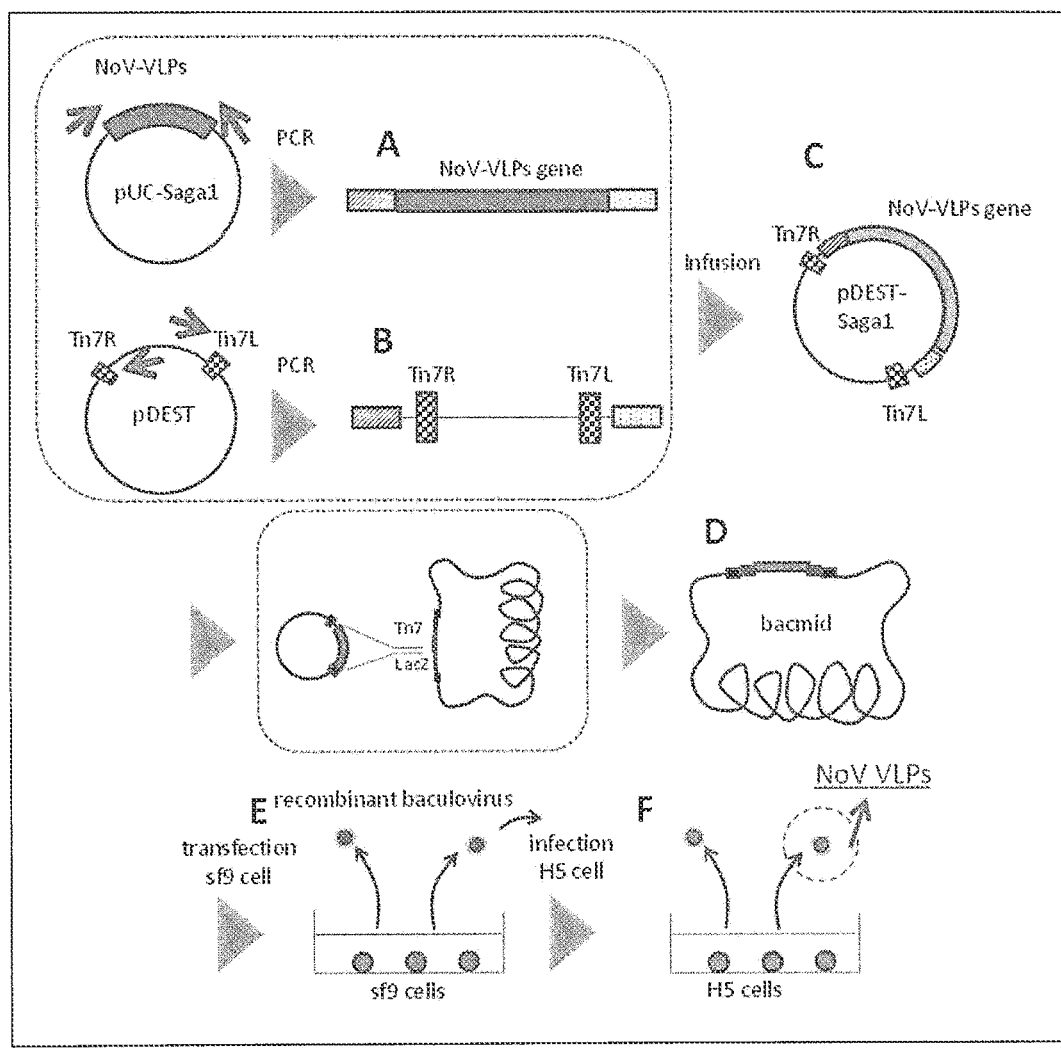
FIG. 1 is a schematic diagram showing a production flow of VLPs.

The present invention relates to provision of a peptide that specifically binds to norovirus, which is useful for specific detection and infection control of norovirus.

The present inventors constructed a cDNA library containing a $10^{14}$-digit number of cDNAs and succeeded in obtaining peptides that specifically bind to norovirus from the library by a cDNA display method, and accomplished the present invention.

According to the present invention, norovirus-binding peptides having high affinity to norovirus are provided. According to the peptides of the present invention, norovirus can be specifically detected with a high sensitivity, and infection of humans with norovirus can be controlled.

The norovirus-binding peptide of the present invention is a peptide composed of 10 amino acids, consisting of an amino acid sequence selected from the group consisting of SEQ ID NOs: 1 to 185 (Tables 16 to 18).

The peptides have been screened from the cDNA library containing a $10^{14}$-digit number of cDNAs by a cDNA display method through in vitro selection using norovirus as a target molecule and are norovirus-binding peptide aptamers having an ability of specifically binding to norovirus. The peptides are each composed of 10 amino acids of the library sequences consisting of 46.4% of hydrophobic amino acids and 53.6% of hydrophilic amino acids. The norovirus-binding peptides of the present invention are those that are recognized as a cluster in cluster analysis based on amino acid sequence similarity or that frequently appear among norovirus-binding peptides screened by in vitro selection using norovirus as a target molecule. Based on the cluster analysis and Examples, among clusters with a hamming distance of 5 or less, a norovirus-binding peptide consisting of an amino acid sequence selected from the group consisting of SEQ ID NOs: 11 to 20, 26 to 60, and 66 to 70 is preferred, and among clusters with a q-gram distance divided into 3-character strings of 4 or less and including 3 or more sequences, a norovirus-binding peptide consisting of an amino acid sequence selected from the group consisting of SEQ ID NOS: 131 to 133 and 143 to 154 is preferred. From the viewpoint of the appearance frequency of a norovirus-binding peptide, a norovirus-binding peptide consisting of an amino acid sequence selected from the group consisting of SEQ ID NOs: 155 to 157, 159, 160, 162, 163, 172, and 173 is preferred. Among these sequence groups, a norovirus-binding peptide consisting of an amino acid sequence selected from the group consisting of SEQ ID NOs: 41 to 60, 131 to 133, 143 to 145, 149 to 154, 155, 156, 163, and 172 is more preferred, and a norovirus-binding peptide consisting of an amino acid sequence selected from the group consisting of SEQ ID NOs: 43, 48, 52, 59, 131, 143, 150, 154, 155, 156, 163, and 172 is particularly preferred.

The peptide of the present invention encompasses, as an aspect, a peptide consisting of an amino acid sequence selected from the group consisting of SEQ ID NOs: 1 to 185 with a cysteine residue added to either or both of an N-terminus and a C-terminus thereof. The peptide having cysteine residues at both terminuses can form a cyclic peptide through a disulfide bond of the cysteine residues.

In addition, the peptide of the present invention encompasses, as another aspect, a peptide consisting of an amino acid sequence selected from the group consisting of SEQ ID NOS: 1 to 185, or an amino acid sequence with a cysteine residue added to either or both of the N-terminus and the C-terminus thereof, wherein arbitrary 1 to 20 amino acid residues are further added to either or both of the N-terminus and the C-terminus of the peptide, as long as the ability of specifically binding with norovirus is maintained.

Viruses that belong to norovirus infecting humans are classified into three gene groups of Genogroup I (GI), Genogroup II (GII), and Genogroup IV (GIV) at present, and 90% or more of reported infection cases are in the GII group. It is inferred there is a serotype corresponding to each genotype. In the present invention, the norovirus encompasses viruses belonging to such norovirus. Empty virus-like particles (VLPs) that are extremely similar to virus particles can be produced by incorporating the structural protein region of a norovirus genome into baculovirus and expressing it in insect cells. The VLPs have the structure of norovirus itself and have antigenicity equivalent to that of virus particles, but do not have the genomic RNA therein, being empty and not having infectivity. Accordingly, in the present invention, norovirus encompasses such VLPs.

Examples of the VLPs include VLPs produced using the norovirus genome, such as a GII.4 Saga1 strain (Genbank No. AB447456), a GII.4 Sydney strain (Genbank No. JX459908.1), a GII.3 TCH strain (Genbank No. KF006265), a GII.2 Ehime strain (Genbank No. LC145808), a GII.17 Kawasaki strain (Genbank No. AB983218), and a GII.17 Saitama strain (Genbank No. KJ196286.1).

The peptide of the present invention can be produced using norovirus (empty virus-like particles: VLPs) as a target molecule by in vitro evolution method known in the art, for example, by a cDNA display method (Nucleic Acid Research, vol. 37, No. 16, e108 (2009)). That is, the peptide can be produced by constructing a cDNA library containing cDNAs (library of peptide-linker-mRNA/cDNA conjugates) and subjecting it to in vitro selection by a CDNA display method.

Specifically, the peptide can be produced by the following steps a) to c) (see FIG. 2):
 a) a step of preparing DNA fragments (construct) encoding a desired random peptide library;
 b) a cDNA display-producing step of producing peptide-linker-mRNA/cDNA in vitro with a cDNA display method using the construct prepared in the above step; and
 c) a selection step of mixing the cDNA displays obtained in the above step with VLPs, collecting the cDNA displays bound to the VLPs, and screening for VLP-bound CDNA displays.

a. Step of Preparing Construct

As a construct for producing a norovirus-binding peptide, DNA fragments including a primer region, a promoter region, an untranslated region, a random region, and a tag region from the 5' end toward the 3' end and encoding a desired random peptide library are constructed. Here, the DNA sequence used as the primer region may be a commercially available general one. As the promoter region, for example, T7 or SP6 can be used. As the untranslated region, for example, an $\Omega$2 region can be used.

For the random region, the DNA is constituted such that hydrophobic amino acids of alanine, valine, leucine, isoleucine, methionine, proline, phenylalanine, and tryptophan is 46.4%, polar amino acids of glycine, serine, threonine, asparagine, glutamine, tyrosine, and cysteine is 29.4%, basic amino acids of lysine, arginine, and histidine is 11.0%, and acidic amino acids of aspartic acid and glutamic acid is 3.0%.

b. cDNA Display-Producing Step

Figure 2:
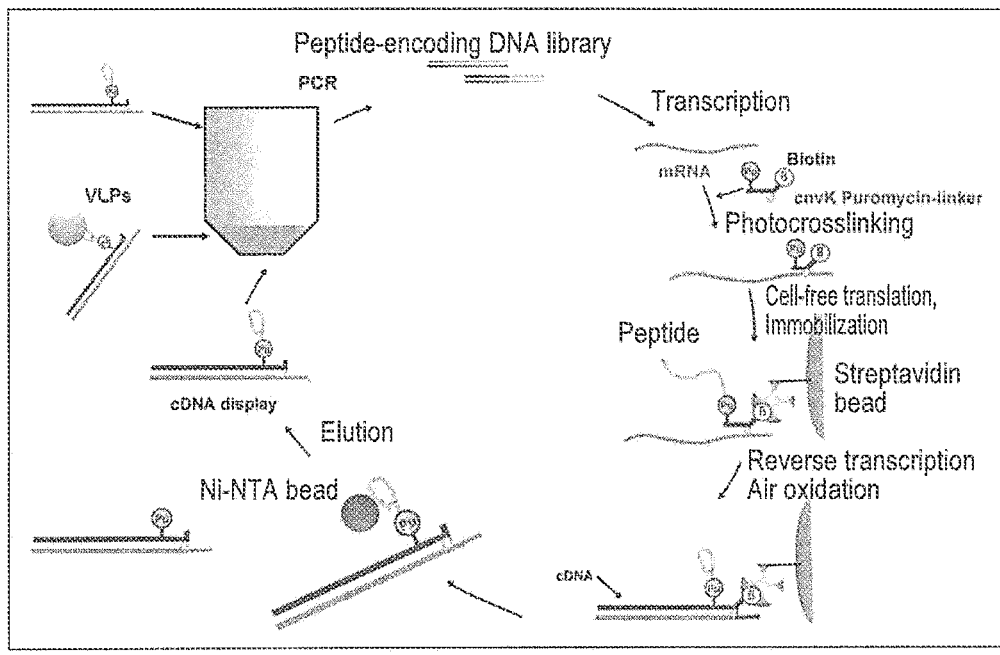
FIG. 2 is a schematic diagram showing an outline of screening for norovirus-binding peptides.

The production of cDNA display includes, as shown in FIG. 2, a mRNA preparation step (b1), a linker-mRNA conjugate formation step (b2), a peptide-linker-mRNA conjugate formation step (b3), a particle-binding step (b4), a cDNA display formation step (b5), a peptide crosslinking step (b6), and a cDNA display release step (b7).

In the mRNA preparation step (b1), mRNA is prepared from the above-described construct by transcription. Then, in (b2), a linker-mRNA conjugate is formed by binding the MRNA obtained in the mRNA preparation step to a linker to which puromycin is bound.

Subsequently, in (b3), a peptide-linker-mRNA conjugate is formed by binding a peptide having an amino acid sequence corresponding to the mRNA sequence translated by a cell-free translation system to puromycin.

Subsequently, in the particle-binding step (b4), the peptide-linker-mRNA conjugate obtained as in above is bound to magnetic particles.

Subsequently, in (b5), the mRNA of the peptide-linker-mRNA conjugate bound to the magnetic particles is reversely transcribed to form cDNA to obtain peptide-linker-mRNA/cDNA ("CDNA display").

Subsequently, in (b6), cysteines on the N-terminus and the C-terminus of the random region of the peptide in the cDNA display obtained in the above step are crosslinked by a crosslinking reaction.

Subsequently, in the complex release step (b7), the CDNA display obtained in the above step is released from the magnetic particles and is purified as needed.

c. Selection Step of VLP-Bound cDNA Displays

The selection of VLP-bound cDNA displays includes a solution addition step (c1), a separation step (c2), and a collection step (c3).

In the solution addition step (c1), a cDNA display-containing solution is added to a VLP solution. Continuously, in the separation step (c2), the mixture solution of the VLP and cDNA display solutions is subjected to, for example, centrifugation at 130,000×g for 5 minutes to precipitate the VLPs. Thus, the cDNA display not bound to the VLPs is separated. Subsequently, in the collection step (c3), the cDNA display bound to the VLPs is collected together with the VLPs.

The peptide of the present invention can be selected from a predetermined DNA library in vitro as described above.

In addition, the peptide of the present invention can be produced by a known method for manufacturing a peptide, for example, by a chemical synthesis method such as a liquid-phase method, a solid-phase method, or a hybrid method of a liquid-phase method and a solid-phase method; or a genetic recombination method.

Since the peptide of the present invention specifically binds to norovirus, it is possible to verify that norovirus is present or not present in a sample by bringing the peptide into contact with the sample that contains or may contain norovirus.

That is, for example, norovirus in a sample can be detected using the peptide of the present invention instead of an anti-norovirus antibody in an immunoassay such as an ELISA method.

The peptide of the present invention when used as a detection reagent may be labeled to be detectable. In labeling of the peptide, for example, not only enzymes such as peroxidase and alkaline phosphatase, but also radioactive materials, fluorescent materials, luminescent materials, etc. are used. In addition, nanoparticles such as colloidal gold and quantum dots, can also be used. In an immunoassay, the peptide of the present invention can also be detected by labeling the peptide with biotin and binding avidin or streptavidin labeled with an enzyme or the like thereto.

Among the immunoassays, an ELISA method using an enzyme label is preferred in the point that it can simply and rapidly measure an antigen. When norovirus is detected by an ELISA method using the peptide of the present invention, for example, norovirus is immobilized on a solid support, and a peptide previously labeled with biotin is bound thereto. After washing, an avidin-modified enzyme is allowed to bind to the biotin and is then allowed to react with an enzyme substrate to cause color development, and the norovirus can be detected by measuring the absorbance. Alternatively, the peptide of the present invention is solid-phased, and norovirus is bound thereto. After washing, an anti-norovirus antibody labeled with an enzyme or an anti-norovirus antibody and an enzyme-labeled secondary antibody is allowed to bind thereto, and the norovirus can be detected by reacting an enzyme substrate to cause color development and measuring the absorbance.

As the enzyme substrate, when the enzyme is alkaline phosphatase, for example, p-nitrophenyl phosphate (NPP) can be used, and when the enzyme is peroxidase, for example, 3,3',5,5'-tetramethylbenzidine can be used. As the solid support, an insoluble support in a shape of, for example, a bead, microplate, test tube, stick, or test piece made of a material such as polystyrene, polycarbonate, polyvinyl toluene, polypropylene, polyethylene, polyvinyl chloride, nylon, polymethacrylate, latex, gelatin, agarose, cellulose, Sepharose™, glass, metal, ceramic, or a magnetic material, can be used. Immobilization of the peptide of the present invention and so on to the solid support can be performed by binding through a known method such as a physical adsorption method, a chemical bond method, or a method of simultaneously performing these methods.

The peptide of the present invention can be a component of a norovirus detection kit. The detection kit can include, in addition to the peptide of the present invention, a reagent and an instrument necessary for detection such as an antibody, a solid support, a buffer solution, an enzyme reaction stopping solution, and a microplate reader.

The sample that is an object of the detection kit is not particularly limited as long as, for example, the sample contains or may contain norovirus, and examples thereof include clinical materials such as feces and vomit collected from a patient, a separated virus culture solution, food such as oyster, and tap and sewage water.

The peptide of the present invention can specifically bind to, for example, the capsid protein of norovirus to inhibit the binding of the virus to a cell. Accordingly, the peptide of the present invention can be used as an anti-norovirus formulation or a medicine for preventing or treating norovirus.

When the peptide of the present invention is used as a medicine, it may be an oral form or a parenteral form and can be appropriately used in combination with known pharmaceutically acceptable avirulent carrier and diluent. Although typical examples of the parenteral administration include an injection, the peptide can also be administered by inhalation with a spray agent, etc.

Regarding the above-described embodiments, the present invention discloses the following aspects:
<1> a norovirus-binding peptide consisting of an amino acid sequence selected from the group consisting of SEQ ID NOs: 1 to 185;
<2> a norovirus-binding peptide consisting of an amino acid sequence selected from the group consisting of SEQ ID NOs: 1 to 185 with a cysteine residue bound to either or both of the N-terminus and the C-terminus thereof;
<3> the norovirus-binding peptide of <2>, wherein the cysteine residue is bound to the N-terminus and the C-terminus of the amino acid sequence selected from the group consisting of SEQ ID NOs: 1 to 185;
<4> the norovirus-binding peptide of <3>, wherein the cysteine residue bound to the N-terminus and the cysteine residue bound to the C-terminus of the peptide consisting of an amino acid sequence selected from the group consisting of SEQ ID NOs: 1 to 185 are linked to each other via a disulfide bond to form a ring;
<5> a norovirus-binding peptide consisting of an amino acid sequence of the peptide according to any one of <1> to <4> with 1 to 20 amino acids bound to either or both of the N-terminus and the C-terminus of the peptide;
<6> a method for detecting norovirus comprising using the norovirus-binding peptide according to any one of <1> to <5>;
<7> a norovirus detection kit comprising the norovirus-binding peptide according to any one of <1> to <5>;
<8> the norovirus-binding peptide according to any one of <1> to <6> or the norovirus detection kit according to <7>, wherein the amino acid sequence selected from the group consisting of SEQ ID NOs: 1 to 185 is an amino acid sequence selected from the group consisting of SEQ ID NOs: 11 to 20, 26 to 60, 66 to 70, 131 to 133, 143 to 157, 159, 160, 162, 163, 172, and 173;
<9> the norovirus-binding peptide according to any one of <1> to <6> or the norovirus detection kit according to <7>, wherein the amino acid sequence selected from the group consisting of SEQ ID NOs: 1 to 185 is an amino acid sequence selected from the group consisting of SEQ ID NOs: 41 to 60, 131 to 133, 143 to 145, 149 to 154, 155, 156, 163, and 172; and
<10> the norovirus-binding peptide according to any one of <1> to <6> or the norovirus detection kit according to <7>, wherein the amino acid sequence selected from the group consisting of SEQ ID NOs: 1 to 185 is an amino acid sequence selected from the group consisting of SEQ ID NOs: 43, 48, 52, 59, 131, 143, 150, 154, 155, 156, 163, and 172.

EXAMPLES

The present invention will now be more specifically described by examples.

Reference Example: Production of VLPs (1) Introduction of VP1 and VP2 Genes into pDEST8

Artificial synthesis of DNAs encoding the VP1 and VP2 regions, which are structural protein regions, of the GII.4 Saga1 strain (Genbank No: AB447456), the GII.3 TCH strain (Genbank No. KF006265), and the GII.17 Saitama strain (Genbank No. KJ196286.1) of norovirus (hereinafter, may be abbreviated to NoV), was outsourced to Fasmac Co., Ltd., and a target gene was introduced therein using the position of the slash of 5'-CAGACGTGTGCTCTTCC-GATCTGAT/ATCAGATCGGAAGAGCGTCGTTAAG-3'

(SEQ ID NO: 186), which is the lacZ-α region of pUCFa plasmid, as the cloning site. In GII.4, a PCR reaction was performed using a synthesized pUC-Saga1 (FIG. 1) DNA as a template and using primer 1 (5'-CATCACAAGTTTGTA-CAAAAAAGCAGGCTGTGA-3': SEQ ID NO: 187) and primer 2 (5'-TATCACCACTTTGTA-CAAGAAAGCTGGGTT-3': SEQ ID NO: 188) to obtain a fragment (FIG. 1-A). In GII.3, a PCR reaction was performed using a synthesized pUC-TCH DNA as a template and using primer 3 (5'-ATCACAAGTTTGTACTGG-GAGGGCGATCGCA-3': SEQ ID NO: 189) and primer 4 (5'-CTATCACCACTTTGTTCGCTACCTCGCGAA-3': SEQ ID NO: 190) to obtain a fragment (FIG. 1-A). In addition, a PCR reaction was performed using a pDEST8 plasmid (Invitrogen) as a template and using primer 5 (5'-ACAAGTGGTGATAGCTTGTCGAGAAGTA-3': SEQ ID NO: 191) and primer 6 (5'-GTACAAACTTGTGAT-GATCCGCGCCCGAT-3': SEQ ID NO: 192) to obtain a fragment (FIG. 1-B). The resulting PCR fragment A and fragment B were mixed and were reacted to each other using an InFusion® HD Cloning Kit (Clontech Laboratories, Inc.), and using 1 ng of the resulting DNA (FIG. 1-C), Competent Quick DH5α (manufactured by TOYOBO CO., LTD.) was transformed. Selection was performed with an LB agar plate culture medium containing 100 μg/mL of ampicillin, the resulting colonies were cultured in an LB liquid culture medium containing 100 μg/mL of ampicillin, and the plasmid was extracted from the resulting cells using a QIAprep® Spin Miniprep Kit (manufactured by QIAGEN N.V.). The sequence of the resulting plasmid with NoV gene introduced was determined using a DNA sequencer to verify that the target sequence was inserted.

In GII.17, a sequence in which an attL1 sequence (5'-ccccaaataatgatttttattttgactgatagtgacctgttcgttgcaacaaattgat gagcaatgctttttataatgccaactttgtacaaaaaagcaggct-3': SEQ ID NO: 193) was introduced to 4 nucleotides upstream from the start codon of the VP1 region and a polyadenine sequence of 30 adenines followed by an attL2 sequence (5'-agct-tacccagctttcttgtacaaagttggcattataagaaagcattgcttatcaat ttgttgcaacgaacaggtcactatcagtcaaaataaaatcattatttg-3': SEQ ID NO: 194) were introduced to 55 nucleotides downstream from the termination codon of the VP2 region was artificially synthesized. The resulting pUC-Saitama and pDEST8 were mixed in equal amounts, and were mixed as shown in Table 1, followed by a reaction at 25° C. for 1 hour. After the reaction, 1 μL of proteinase K (manufactured by Takara Bio Inc.) was added thereto, followed by a reaction at 37° C. for 10 minutes. Using 1 ng of the reaction solution, Competent Quick DH5α (manufactured by TOYOBO CO., LTD.) was transformed, and selection was performed with an LB agar plate culture medium containing 100 μg/mL of ampicillin. The resulting colonies were cultured in an LB liquid culture medium containing 100 μg/mL of ampicillin, and pDEST8 encoding GII.17 was purified and obtained from the resulting cells using a QIAprep® Spin Miniprep Kit (manufactured by QIAGEN N.V.).

TABLE 1

| Composition | Content |
| --- | --- |
| pUC-Saitama | 0.75 μL (150 ng) |
| pDEST8 (manufactured by Invitrogen) | 1.0 μL (150 ng) |

TABLE 1-continued

| Composition | Content |
| --- | --- |
| UltraPure water (manufactured by Invitrogen) | 6.25 μL |
| BP Clonase ™ (manufactured by Thermo Fisher Scientific) | 2 μL |

(2) Introduction of VP1 and VP2 Genes into bMON14272 Bacmid (Manufactured by Invitrogen)

The obtained plasmid was introduced into Bacmid according to the protocol attached to the product by the following method (FIG. 1-D).

NoV VP1 and VP2 regions were introduced into bMON14272 bacmid (manufactured by Invitrogen) using the obtained plasmid with Nov gene introduced and MAX Efficiency DH10Bac Competent Cells (manufactured by Invitrogen) (FIG. 1-D). Whether each gene was introduced into bacmid or not was verified by performing selection in an LB culture medium containing 40 μg/mL of IPTG (isopropyl β-D-1-thiogalactopyranoside: manufactured by FUJIFILM Wako Pure Chemical Corporation), 100 μg/mL of X-Gal (5-bromo-4-chloro-3-indolyl β-D-galactopyranoside: manufactured by FUJIFILM Wako Pure Chemical Corporation), 50 μg/mL of kanamycin, 7 μg/mL of gentamicin, and 10 μg/mL of tetracycline (kanamycin resistance gene, tetracycline resistance gene, and gentamicin resistance gene were encoded in bMON14272, helper plasmid present in DH10Bac Competent Cell, and the region of pDEST to be inserted into bacmid, respectively), and further whether each fragment was inserted into a target side or not was verified by color selection. The obtained white colonies were cultured in an LB liquid culture medium containing 50 μg/mL of kanamycin, 7 μg/mL of gentamicin, and 10 μg/mL of tetracycline, and bacmid was extracted from the resulting cells using a QIAprep® Spin Miniprep Kit (manufacture by QIAGEN N.V.). The concentration of the extracted DNA solution was verified with NanoDrop® (manufactured by Thermo Fisher Scientific).

(3) Production of Recombinant Baculovirus (rBV) by Transfection of Bacmid Having NoV VP1 and VP2 Introduced Bacmid into which NoV VP1 and VP2 genes were introduced was transfected into Sf9 cells (manufactured by Invitrogen) using a Lipofecctamine® LTX Reagent & Plus™ Reagent (manufactured by Invitrogen) according to the protocol attached thereto (FIG. 1-E). The transfected cells were cultured using an Sf900III (manufactured by Invitrogen) culture medium at 27° C. for 1 week. After the culture, the culture medium was centrifuged, and the supernatant was collected to obtain recombinant baculovirus (rBV) including the NoV gene.

(4) Production of NoV VLP by Infection with rBV

The rBV was added at $1.0 \times 10^7$ pfu/mL to $1.0 \times 10^7$ cells/flask of High Five™ cells (manufactured by Invitrogen) to cause infection at an MOI of 2, and the cells were cultured using an Express Five™ (manufactured by Invitrogen) culture medium at 27° C. (FIG. 1-F). After 7 days from the infection, the culture supernatant was collected by centrifugation. The collected supernatant was further centrifuged at 10,000×g for 1 hour to pellet down the baculovirus, and the cell supernatant was collected. The collected supernatant containing NoV VLP was further centrifuged with an SW32Ti rotor (manufactured by Beckman Coulter, Inc.) at 32,000 rpm for 2 hours to pellet down the NoV VLP. The pellet separated from the supernatant was dissolved in an Express five culture medium containing 1.9 mg of CsCl (for density gradient centrifugation, manufactured by FUJIFILM Wako Pure Chemical Corporation) and centrifuged using SW55Ti (Manufactured by Beckman Coulter, Inc.) at 40,000 rpm for 20 hours for separation and purification, and a fraction visually observed by irradiation with white light was collected. The collected fraction was centrifuged again with the SW32Ti rotor at 32,000 rpm for pellet down, the supernatant was removed, and the pellet was suspended in 500 UL of an Express Five™ culture medium. The VLP concentration was quantitatively measured by a Bradford method. As a standard protein, BSA (manufactured by FUJIFILM Wako Pure Chemical Corporation) was used.

Example 1: Manufacturing of Norovirus-Binding Peptide (see FIG. 2)

(1) Construction of DNA Library

A DNA library was designed such that the peptide library is composed of peptides having a length of 10 amino acids.

(Nucleotide sequence of DNA library)
[SEQ ID NO: 195]
5'-GATCCCGCGAAATTAATACGACTCACTATAGGGGAAGTATTTTTACA

ACAATTACCAACAACAACAACAAACAACAACAACATTACATTTTACATTC

TACAACTACAAGCCACCATGGGCTGCXYZXYZXYZXYZXYZXYZXYZXYZ

XYZXYZTGCGGGGGAGGCAGCCATCATCATCATCATCACGGCGGAAGCAG

GACGGGGGCGGCGTGGAAA-3'

TABLE 2

Each sequence included in template DNA and position thereof

| Nucleotide No. | Region Name |
| --- | --- |
| 14 to 33 | T7 promoter |
| 34 to 36 | 5' cap |
| 37 to 107 | Ω sequence |
| 110 to 114 | Kozak sequence |
| 115 to 120 | MG |
| 121 to 156 | Cys-library sequence-Cys |
| 157 to 168 | GGGS |
| 169 to 186 | Hexahistidine tag |
| 187 to 195 | GGS |
| 196 to 217 | Hybridization region for linker DNA |

The above-mentioned DNA library was constructed by binding three DNA sequence fragments, a T7-PRO-Ω region (SEQ ID NO: 196), a random region (SEQ ID NO: 197), and a His-Y tag region (SEQ ID NO: 198), by extension PCR. This library was designed such that cysteines appear on the N-terminus and the C-terminus of the random region. The random region, the His-Y tag region, and the T7-PRO-Ω region were obtained by outsourcing the respective DNA synthesis to TSUKUBA OLIGO SERVICE CO. LTD. The following extension PCR was performed using them to construct the above DNA library.

[SEQ ID NO: 196]
5' GATCCCGCGAAATTAATACGACTCACTATAGGGGAAGTATTTTTACA

ACAATTACCAACAACAACAACAAACAACAACAACATTACATTTTACATTC

TACAACTACAAGCCACCATG 3'

[SEQ ID NO: 197]
5'-ACAACTACAAGCCACCATGGGCTGCXYZXYZXYZXYZXYZXYZXYZXYZX

YZXYZXYZTGCGGGGGAGGCAGCCATCATCA-3'

In the sequences above, the ratios of appearance frequency of nucleotides (A:T:G:C) other than ATCG are as follows:
X:A=0.3, T=0.2, G=0.3, C=0.2,
Y:A=0.1, T=0.4, G=0.3, C=0.2, and
Z:A=0, T=0.4, G=0.3, C=0.3.

[SEQ ID NO: 198]
5' TTTCCACGCCGCCCCCGTCCTGCTTCCGCCGTGATGATGATGATGA

TGGCTGCCTCCCCC 3'

In the extension PCR of the first stage of synthesis, a reaction solution having the composition shown in the following Table 3 was prepared to 50 μL with ultrapure water, and a DNA fragment including the random region and the His-Y tag region bound to each other was amplified by the following PCR program. The PCR program included (a) 96° C. (2 min), (b) 94° C. (20 sec), (c) 69° C. (5 sec), (d) 72° C. (20 sec), and (e) 72° C. (2 min), and the steps (b) to (d) were repeated 5 cycles.

TABLE 3

| Composition | Content (μL) |
| --- | --- |
| Random region (10 pmol/μL) | 1 |
| His-Y tag region (10 pmol/μL) | 1 |
| 5 × PrimeSTAR ® Buffer (manufactured by Takara Bio Inc.) | 10 |
| dNTP mixture (25 mM each) (manufactured by Takara Bio Inc.) | 4 |
| TaKaRa PrimseSTAR ® (manufactured by Takara Bio Inc.) | 0.5 |

In the extension PCR of the second stage, a reaction solution having the composition shown in the following Table 4 was prepared to 50 UL with ultrapure water, the T7-PRO-SD region was extended by the following PCR program to amplify the DNA library. The PCR program included (a) 96° C. (2 min), (b) 94° C. (20 sec), (c) 59° C. (5 sec), (d) 72° C. (30 sec), and (e) 72° C. (2 min), and the steps (b) to (d) were repeated 15 cycles. Subsequently, the DNA library was purified by polyacrylamide gel electrophoresis (PAGE).

TABLE 4

| Composition | Content (μL) |
| --- | --- |
| Elongation PCR product in first stage (0.5 pmol/μL) | 10 |
| T7-PRO-Ω region (10 pmol/μL) | 5 |
| 5 × PrimeSTAR ® Buffer (manufactured by Takara Bio Inc.) | 10 |
| dNTP mixture (25 mM each) (manufactured by Takara Bio Inc.) | 4 |
| TaKaRa PrimeSTAR ® (manufactured by Takara Bio Inc.) | 0.25 |

(2) Transcription of DNA Library

Transcription of the DNA library was performed using RiboMAX™ Large Scale RNA Production Systems-T7 (manufactured by Promega Corporation) according to the protocol attached thereto. The reaction scale was 20 μL using 1 µg of the DNA library. The MRNA obtained by the transcription reaction was purified using an After Tri-Reagent® RNA Clean-Up Kit (manufactured by FAVORGEN Biotech Corporation).

Figure 3:
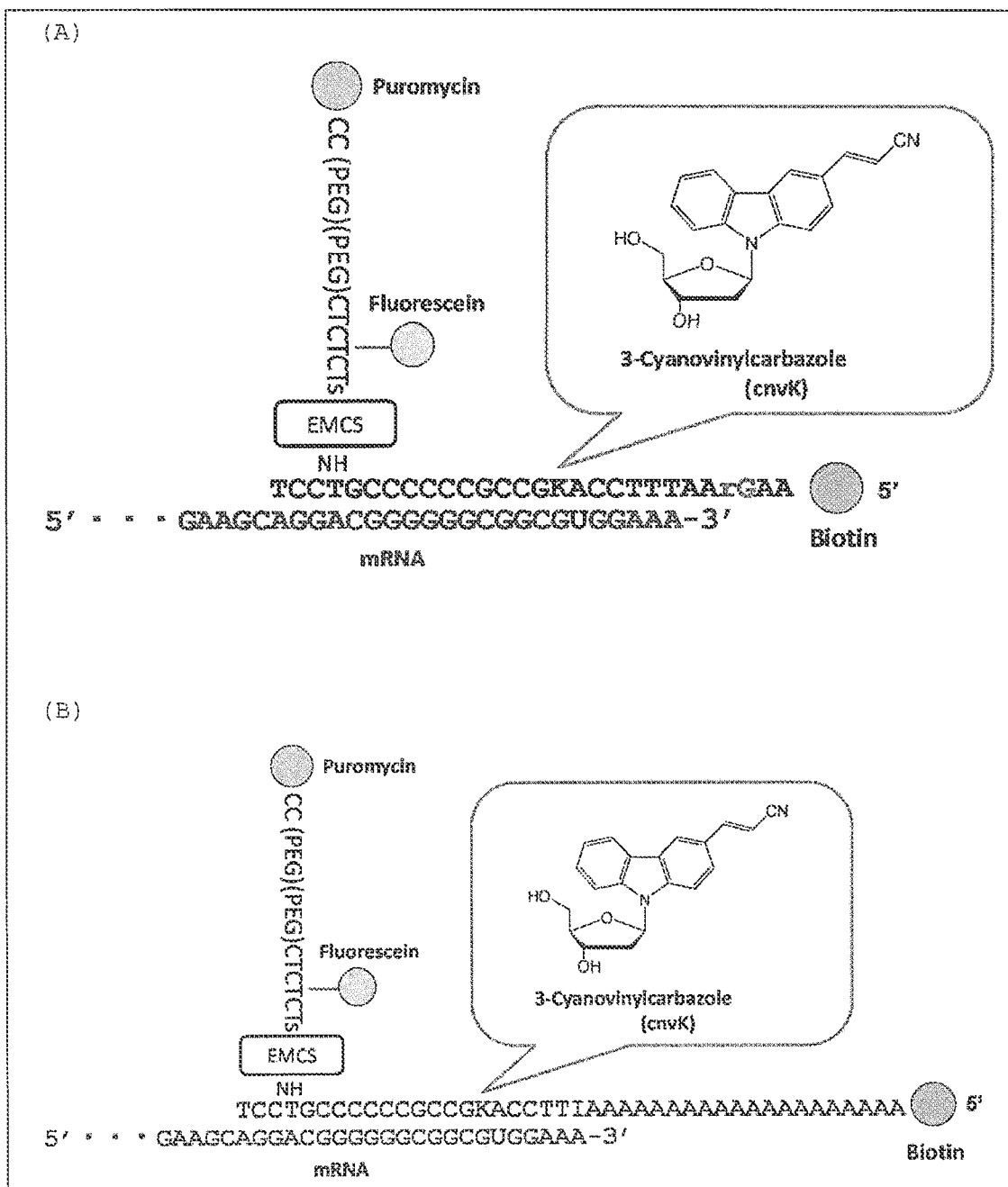
FIG. 3 is a schematic diagram showing mRNA-linker conjugates (A: for selection, B: for analysis).

Subsequently, the obtained mRNA was ligated to a puromycin linker described later as follows (FIG. 3 (A)). Firstly, 20 pmol of each of a puromycin linker and the mRNA, 4 µL of 0.25 M Tris-HCl (pH 7.5), and 4 µL of 1 M NaCl were mixed, and the mixture was diluted to 20 µL with ultrapure water. The reaction solution was incubated at 90° C. for 2 minutes and at 70° C. for 1 minute, was then cooled to 4° C., and was then annealed at 25° C. for 1 hour. Subsequently, crosslinking with the puromycin linker was performed using a CL-1000 Ultraviolet Crosslinker by irradiation with ultraviolet light having a wavelength of 365 nm under a condition of 405 mJ/cm$^2$.

<DNA of Puromycin Linker>

Puromycin linker DNA 1 (FIG. 3(A)) was synthesized by chemical crosslinking of two segments (puromycin segment (PS) and a short biotin segment (SBS)) using EMCS (N-(6-maleimidocaproyloxy) succinimide: manufactured by DOJINDO LABORATORIES). The linker used was that described in the literature (Mochizuki Y., Suzuki T., Fujimoto K., Nemoto N., (2015), A versatile puromycin-linker using cnvK for high-throughput in vitro selection by cDNA display, J. Biotechnol., 212, 174-80).

The sequence structure of the puromycin segment (PS) is shown below:

5'-(S)-TCTCTC(F)-(PEG)(PEG)-CC-(Puro)-3'.

Here, (S) represents 5'-thiol-modifier C6 (compound name: S-trityl-6-mercaptohexyl-1-[(2-cyanoethyl)-(N,N-diisopropyl)]-phosphoramidite, manufactured by Glen research), and (F) represents fluoresceine-dT. (Puro) represents puromycin CPG (5'-dimethoxytrityl-N-trifluoroacetyl-puromycin, 2'-succinoyl-long chain alkylamino-CPG, manufactured by Glen research).

The sequence structure of the short biotin segment (SBS) is then shown below:

5' (B)-AA-(rG)-AATTTCCA(K)GCCGCCCCCG(Y)CCT-3' (SEQ ID NO: 199).

Here, (Y) represents amino-modifier C6 deoxythymine (5'-dimethoxytrityl-5-[N-(trifluoroacetylaminohexyl)-3-acrylamido]-2'-deoxyuridine, 3'-[(2-cyanoethyl)-(N,N-diisopropyl)]-phosphoramidite, manufactured by Glen research), (K) represents 3-cyanovinylcarbazole (cnvK), (B) represents biotin-triethylene glycol (TEG), manufactured by Glen research), and (rG) represents riboguanine (manufactured by Glen research). Synthesis of PS and SBS was outsourced to TSUKUBA OLIGO SERVICE CO. LTD. and was performed according to a usual method.

The 5'-thiol group of the PS was reduced with 1 mM tris(2-carboxyethyl) phosphine hydrochloride (TCEP: manufactured by Thermo Fisher Scientific) in 100 µL of a 50 mM phosphate buffer (pH 7.0) at room temperature for 6 hours, and desalted with a NAP-5 column (manufactured by GE Healthcare) at the time of use. A biotin loop in a total amount of 10 nmol and EMCS in a total amount of 2 µmol were added to 100 µL of a 0.2 M sodium phosphate buffer (pH 7.0). Subsequently, the mixture was incubated at 37° C. for 30 minutes, and ethanol precipitation was performed at 4° C. to remove excess EMCS.

This precipitate was washed twice with 500 µL of 70% ethanol cooled in advance in an ice bath and was dissolved in 10 µL of a 0.2 M sodium phosphate buffer (pH 7.0) cooled in advance. The reduced PS was immediately added thereto, followed by stirring at 4° C. overnight. After addition of 4 mM TCEP, incubation was performed at 37° C. for 15 minutes to stop this reaction. Subsequently, ethanol precipitation was performed to remove excess PS at room temperature. In order to remove the biotin loop and uncross-linked biotin loop-EMCS complex, the precipitate was dissolved in a 0.1 M TEAA (triethylamine acetate: manufactured by Glen research) or phosphate buffer and was purified using a C18 HPLC column under the following condition:

Column: AR-300, 4.6×250 mm (manufactured by NACALAI TESQUE, INC.); solvent: A: 0.1 M TEAA, solvent B: acetonitrile/water (80:20, v/v) gradient, B/A (15 to 35%, 33 min); flow rate: 0.5 mL/min; and detection wavelength: absorbance 254 nm and 490 nm.

Fractions from the final peak at absorbance 254 nm (corresponding to a single peak at absorbance 490 nm) were collected. After drying, the fractions were resuspended in water treated with diethylpyrocarbonate (DEPC) and were stored. As described above, puromycin linker DNA 1 could be obtained.

<Binding of mRNA and Puromycin Linker DNA 1>

To 20 pmol of the MRNA obtained by transcription, 20 pmol of the puromycin linker DNA 1, 4 µL of 0.25 M Tris-HCl (pH 7.5), and 4 µL of 1 M NaCl were added, and prepared to 20 µL in total with nuclease-free water (Table 5). Incubation was performed at 90° C. for 1 minute and then at 70° C. for 1 minute, and the temperature was then lowered to 25° C. at a rate of 0.04° C./s. The cnvK and uracil in the mRNA were covalently bonded by irradiation with 405 mJ of ultraviolet light (365 nm) to form a mRNA-linker conjugate. The amount synthesized here was that required in each round.

TABLE 5

Composition for binding of mRNA and puromycin linker DNA

| Composition | Content |
| --- | --- |
| Puromycin linker DNA 1 | 20 pmol |
| mRNA | 20 pmol |
| 0.25M Tris-HCl (pH 7.5) | 4 µL |
| 1M NaCl | 4 µL |

<Translation>

The mRNA-linker conjugate was translated by a cell-free translation system as follows. A reaction solution having the composition ratio shown in the following Table 6 was prepared to 50 µL with ultrapure water and was reacted at 37° C. for 15 minutes, and 24 µL of 3 M KCl and 6 µL of 1 M MgCl$_2$ were added to this reaction solution. Subsequently, this solution was further reacted at 37° C. for 20 minutes to bind between the C-terminus of the translated peptide and puromycin to obtain a mRNA-peptide conjugate.

TABLE 6

| Composition | Content |
| --- | --- |
| Rabbit reticulocyte lysate, nuclease treated (manufactured by Promega Corporation) | 35 µL |
| Amino acid mixture minus leucine, 1 mM (manufactured by Promega Corporation) | 0.5 µL |
| Amino acid mixture minus cysteine, 1 mM (manufactured by Promega Corporation) | 0.5 µL |
| mRNA/linker ligation product | 6 pmol |

(3) Purification by Magnetic Beads

Streptavidin (SA) magnetic particles (Dynabeads™ MyOne™ Streptavidin C1, manufactured by Invitrogen) were washed according to the manual and were put in an Eppendorf tube in an amount required for immobilizing the peptide-linker-mRNA conjugate, followed by leaving to stand on a magnetic stand for 1 minute. Subsequently, the supernatant was removed, followed by resuspension in a solution A (100 mM NaOH, 50 mM NaCl). After tapping for 1 to 2 minutes, the tube was left to stand on a magnetic stand for 1 minute. Subsequently, the same operation was repeated once with the solution A, and the same operation was repeated once with a solution B (100 mM NaCl).

To the peptide-linker-mRNA conjugate, the same amount of 2× binding buffer (20 mM Tris-HCl (pH 8.0), 2 mM EDTA, 2 M NaCl, 0.2% Tween 20, and 500 mM EDTA) was added, and the mixture was incubated together with the streptavidin (SA) magnetic particles at room temperature for 30 minutes. The Eppendorf tube was left to stand on a magnetic stand for 1 minute, and the supernatant was then removed. After addition of 200 μL of 1× binding buffer, tapping was performed for 1 to 2 minutes, and the tube was then left to stand on a magnetic stand for 1 minute, followed by removal of the supernatant. This operation was further repeated twice to immobilize the peptide-linker-mRNA conjugate on the streptavidin (SA) magnetic particles.

(4) Synthesis of cDNA by Reverse Transcription Reaction

A reaction solution of the ratio shown in the following Table 7 was added to the immobilized peptide-linker-mRNA conjugate in the same volume as that of the streptavidin (SA) magnetic particles, and incubation was performed at 42° C. for 30 minutes for reverse transcription to prepare cDNA display in the state that the conjugate was immobilized on the streptavidin (SA) magnetic particles.

TABLE 7

| Composition | Content (μL) |
| --- | --- |
| 2.5 mM dNTP MIX (manufactured by Takara Bio Inc.) | 20 |
| 5 × RT Buffer (manufactured by TOYOBO CO., LTD.) | 10 |
| Nuclease-free water | 18 |
| ReverTra Ace ™ (manufactured by TOYOBO CO., LTD.) | 2 |

(5) Crosslinking Reaction of Peptide

The cDNA display immobilized on the streptavidin (SA) magnetic beads were washed with a crosslinking buffer (containing 100 mM sodium phosphate (pH 7.4), 0.15 M NaCl, 10 mM EDTA, and 0.025% Tween 20) once, and then 125 μL of a crosslinking buffer containing 10 mM tris(2-carboxyethyl) phosphine hydrochloride (TCEP: manufactured by Thermo Fisher Scientific) and 4 mM bismaleimidoethane (BMOE: manufactured by Thermo Fisher Scientific) was added, followed by incubation at 25° C. for 1 hour to perform crosslinking reaction of the cysteines on the N-terminus and the C-terminus of the random region.

(6) Elution from Purification by Magnetic Beads

The cDNA display immobilized on the streptavidin (SA) magnetic beads was washed with 1×His-tag wash buffer (containing 10 to 30 mM sodium phosphate (pH 7.4), 0.25 to 0.75 M NaCl, 5 to 30 mM imidazole, and 0.025% to 0.1% Tween 20) once, and then 30 μL of 1×His-tag wash buffer containing 10 U of RNase T1 (manufactured by Ambion, Inc.) was added, followed by incubation at 37° C. for 15 minutes to elute the cDNA display cleaved from the streptavidin (SA) magnetic beads at the cleavage site (ribo G) in the liker.

(7) Purification by Ni-NTA

Ni-NTA magnetic beads (His Mag Sepharose™ Ni: manufactured by GE Healthcare) were put at 10 μL in an Eppendorf tube, followed by leaving to stand on a magnetic stand for 1 minute. Subsequently, the supernatant was removed, followed by resuspension in 1×His-tag wash buffer. Tapping was performed for 1 to 2 minutes, and the tube was then left to stand on a magnetic stand for 1 minute. This procedure was further repeated once more.

The cDNA display was incubated together with the Ni-NTA magnetic beads at room temperature for 30 minutes. The Eppendorf® tube was left to stand on a magnetic stand for 1 minute, and the supernatant was then removed. After addition of 200 μL of 1×His-tag wash buffer, tapping was performed for 1 to 2 minutes, and the tube was then left to stand on a magnetic stand for 1 minute, followed by removal of the supernatant. This operation was further repeated, and 10 μL of a His-tag elution buffer (containing 10 to 30 mM sodium phosphate (pH 7.4), 0.25 to 0.75 M NaCl, 250 to 500 mM imidazole, and 0.025% to 0.1% Tween 20) was then added, followed by incubation at room temperature for 15 minutes to purify the cDNA display.

(8) In Vitro Selection Cycle

The cDNA displays and VLPs were mixed according to the following Table 8 and were prepared to 1 mL with a selection buffer (containing 10 to 30 mM Tris-HCl (pH 7.4) and 0.1 to 0.3 M NaCl), followed by incubation at 25° C. for 30 minutes.

TABLE 8

| | cDNA display | VLP |
| --- | --- | --- |
| R1 | 100 nM | GII.4 500 nM |
| R2 | 16 nM | GII.4 50 nM |
| R3 | 10 nM | GII.4 25 nM |
| R4 | 4 nM | GII.4 25 nM |
| R5 | 4 nM | GII.4 20 nM |
| R6 | 4 nM | GII.4 10 nM |
| R7 | 4 nM | GII.4 10 nM |

R1 to R7 are the numbers of in vitro selection cycles.

<Separation of VLP-CDNA Display Complex by Centrifugation>

The above mixture was put in a centrifuge tube and was centrifuged with an ultracentrifuge (CS150FNX, manufactured by Hitachi, Ltd.) at 130,000×g at 4° C. for about 2 hours. The supernatant was removed. The wall surface was washed with 1 mL of a selection buffer, and the supernatant was then removed. The precipitate was redissolved in 100 μL of RNase-free water.

<Separation of VLP-cDNA Display Complex by Dialysis>

The constructed cDNA display and VLPs were incubated in 100 μL of a dialysis selection buffer (20 mM HEPES (pH 7.4), 150 mM NaCl, and 0.05% Tween 20) at the concentrations shown in Table 9 below at 25° C. for 30 minutes. Subsequently, the resultant was diluted to 1 mL with the dialysis selection buffer, and was put in Float-A-Lyzer® G2 Dialysis Device CE, 1000 kD MWCO (manufactured by Spectrum Laboratories, Inc.) and was dialyzed with 1 L of the dialysis selection buffer as the external solution at 25° C. During the dialysis, the external solution was replaced with new one 3 times every 2 hours, and the dialysis was performed overnight (for 8 hours) after the 4th replacement.

The dialysis product was concentrated with Amicon® Ultra 100K (manufactured by Merck Millipore S.A.S.) at 14,000×g for 5 minutes.

(9) Selection of GII.3 and GII.17 VLP as Objects

To an immunoplate (C-BOTTOM, CLEAR, MICROLON®, HIGH BINDING, manufactured by Greiner Bio-One), 100 µL of 3 µg/mL GII.3 or GII.17 VLP solution was added, and immobilization was performed at 4° C. overnight. Subsequently, the solution was discarded, and 200 µL of a blocking agent (EMD Millipore™ Blok™ NSB Blocking agents, Thermo Fisher Scientific) was added, followed by gently stirring at room temperature for 2 hours for blocking. On this occasion, wells not immobilizing the VLP were also subjected to similar blocking to be used in preselection.

The solution was discarded from the wells, the wells were washed with 200 µL of a wash buffer (10 mM Hepes (pH 7.4), 150 mM NaCl, and 0.05% Tween 20) three times, and 100 µL of cDNA display (constructed from 1.5 pmol of mRNA-linker) was then put in the wells not immobilizing the VLP, followed by gently stirring at room temperature for 30 minutes to perform preselection. Subsequently, the supernatant containing cDNA display that had not bound to the blocking agent was put in the wells immobilizing the VLP, followed by gently stirring at room temperature for 30 minutes to be bound to the VLP. The supernatant was discarded, washing with 100 µL of the wash buffer was performed four times, and 100 µL of a 5% SDS solution was then added, followed by incubation at 50° C. for 15 minutes to elute the bound cDNA display.

Subsequently, the VLP-CDNA display complex obtained above was diluted to 100 µL with a dialysis selection buffer, and 10 µL of a coprecipitating agent (Quick-Precip™ Plus Solution, manufactured by EdgeBio) and 220 µL of 100% ethanol were added, followed by centrifugation at 20,000×g for 5 minutes. Subsequently, the supernatant was discarded, and 1 mL of 70% ethanol was added for rinsing. The tube was dried for 10 minutes, elution with 20 µL of RNase-free water was then performed, and PCR reaction was performed using GATCCCGCGAAATTAATACGACTCAC-TATAGGGGAAGTATTTTTACAACAATTACCA ACA (SEQ ID NO: 200) as a forward primer and TTTC-CACGCCGCCCCCCGTCCT (SEQ ID NO: 201) as a reverse primer. The PCR program was (a) 98° C. for 2 minutes, (b) 95° C. for 20 seconds, (c) 69° C. for 20 seconds, (d) 72° C. for 20 seconds (steps (b) to (d) were performed 25 cycles), and (e) 72° C. for 1 minute.

TABLE 9

| Composition | Content (µL) |
| --- | --- |
| 10 × Ex Taq ® Buffer (manufactured by Takara Bio Inc.) | 2.5 |
| 2.5 mM dNTP mixture (manufactured by Takara Bio Inc.) | 2 |
| 20 µM forward primer (SEQ ID NO: 200) | 0.5 |
| 20 µM reverse primer (SEQ ID NO: 201) | 0.5 |
| Ethanol precipitate | 3 |
| Nuclease-free water | 16.4 |
| Ex Taq | 0.1 |

The resulting PCR product was used as library DNA in the subsequent cycle, and the operations after the transcription of library described in the above (2) were similarly performed to repeat a selection cycle.

<Analysis of Genetic Sequence Information>

After the in vitro selection cycle (7 cycles for GII.4 and 5 cycles for GII.3 and GII.17 based on the libraries of 7 cycles obtained by GII.4 dialysis), a sequence library was prepared by the following method, and the sequence information was analyzed. The preparation of the sequence library and the sequencing were performed according to the 16S Metagenomic Sequencing Library Preparation protocol (manufactured by Illumina, Inc.).

1) Amplicon PCR

The reagents shown in Table 10 were mixed, and PCR was performed by the following program:

at 95° C. for 3 minutes;

23 cycles of the following reactions;

at 95° C. for 30 seconds, at 55° C. for 30 seconds, and at 72° C. for 30 seconds, at 72° C. for 5 minutes; and holding at 4° C.

TABLE 10

| Composition of solution | |
| --- | --- |
| Sequence library (5 ng/µL) | 2.5 µL |
| Amplicon PCR Forward Primer 1 µM (SEQ ID NO: 202) | 5 µL |
| Amplicon PCR Reverse Primer 1 µM (SEQ ID NO: 203) | 5 µL |
| 2 × KAPA HiFi Hotstart ReadyMix ® (manufactured by NIPPON Genetics Co., Ltd.) | 12.5 µL |
| Total | 25 µL |

SEQ ID NO: 202:
TCGTCGGCAGCGTCAGATGTGTATAAGAGACAGCATTCTACAACTACAAG

CCACCATG

SEQ ID NO: 203:
GTCTCGTGGGCTCGGAGATGTGTATAAGAGACAGTTTCCACGCCGCCCCC

CGTCCTGCTTC

2) Clean Up

The Amplicon PCR product was purified using AMPure® XP beads (manufactured by Beckman Coulter, Inc.). To the plate including the PCR product, 20 µL of the AMPure® XP beads were added and the mixture was gently mixed by pipetting with a micropipette 10 times, followed by leaving to stand at room temperature for 5 minutes. The plate was placed on a magnetic stand and was left to stand for 2 minutes, and the supernatant was then discarded. While the plate was being placed on the magnetic stand, 200 µL of 80% ethanol was added to each well, and after leaving to stand for 30 seconds, the supernatant was discarded. This procedure was repeated twice. The ethanol was air-dried by leaving to stand for 10 minutes, the plate was then taken out from the magnetic stand, and 52.5 µL of 10 mM Tris pH 8.5 solution was added to each well, followed by leaving to stand at room temperature for 2 minutes. The plate was placed on the magnetic stand and was left to stand for 2 minutes again, and 50 µL of the solution in each well was transferred to the corresponding well of a new 96-well PCR plate.

3) Index PCR

A PCR reaction was performed for adding an adaptor and an index sequence for sequencing to the purified Amplicon PCR product.

The reagents shown in Table 11 were mixed, and PCR was performed by the following program:
at 95° C. for 3 minutes;
8 cycles of the following reactions;
  at 95° C. for 30 seconds,
  at 55° C. for 30 seconds, and
  at 72° C. for 30 seconds,
at 72° C. for 5 minutes; and holding at 4° C.

TABLE 11

| Composition of solution | |
| --- | --- |
| Purified Amplicon PCR product | 2.5 µL |
| Nextera ® XT Index Primer 1 (N7xx) (SEQ ID NOs: 204 and 205) | 2.5 µL |
| Nextera ® XT Index Primer 2 (S5xx) (SEQ ID NOs: 206 and 207) | 2.5 µL |
| 2x KAPA HiFi Hotstart ReadyMix ® | 12.5 µL |
| UltraPure Water (manufactured by Invitrogen) | 5 µL |
| Total | 25 µL |

The used index primer set is shown in the following Table 12.

TABLE 12

| | Index Primer set | |
| --- | --- | --- |
| | Centrifugation | Dialysis |
| Run 1 (S511) | S511, N719 | S511, N720 |
| Run 2 (S510) | S510, N719 | S510, N720 |

SEQ ID NO: 204 (N719):
CAAGCAGAAGACGGCATACGAGATGCGTAGTAGTCTCGTGGGCTCGG

SEQ ID NO: 205 (N720):
CAAGCAGAAGACGGCATACGAGATCGGAGCCTGTCTCGTGGGCTCGG

SEQ ID NO: 206 (S511):
AATGATACGGCGACCACCGAGATCTACACTCTCTCCGTCGTCGGCAG
CGTC

SEQ ID NO: 207 (S510):
AATGATACGGCGACCACCGAGATCTACACCGTCTAATTCGTCGGCAG
CGTC

4) Clean Up 2

The Index PCR product was purified using AMPure® XP beads (manufactured by Beckman Coulter, Inc.). To the plate including the PCR product, 56 µL of the AMPure® XP beads were added and the mixture was gently mixed by pipetting with a micropipette 10 times, followed by leaving to stand at room temperature for 5 minutes. The plate was placed on a magnetic stand and was left to stand for 2 minutes, and the supernatant was then discarded. While the plate was being placed on the magnetic stand, 200 µL of 80% ethanol was added to each well, and after leaving to stand for 30 seconds, the supernatant was discarded. This procedure was repeated twice. The ethanol was air-dried by leaving to stand for 10 minutes, the plate was then taken out from the magnetic stand, and 25 µL of 10 mM Tris pH 8.5 solution was added to each well, followed by leaving to stand at room temperature for 2 minutes. The plate was placed on the magnetic stand and was left to stand for 2 minutes again, and 50 µL of the solution in each well was transferred to the corresponding well of a new 96-well PCR plate.

The purified Index PCR product was validated using Bioanalyzer® DNA 1000 chip (manufactured by Agilent Technologies, Inc.).

5) qPCR

The purified Index PCR product was subjected to qPCR using KAPA® Library Quantification Kit (manufactured by NIPPON Genetics Co., Ltd.).

A mixture of 12 µL of KAPA® SYBR® FAST qPCR Master Mix to which Primer Mix was added in advance, 4 µL of UltraPure Water, and 4 µL of a 100-fold dilution of the Index PCR product was subjected to qPCR. As the samples for a standard curve, Std 1 to 6 included in the kit were used. The PCR was Performed by the Following Program:
at 95° C. for 5 minutes; and
35 cycles of the following reactions;
  at 95° C. for 30 seconds, and
  at 60° C. for 45 seconds.

A standard curve was drawn from the Ct values of Std 1 to 6, and sample concentration was calculated.

6) Preparing DNA Libraries for Sequencing

The Reagent Cartridge of Miseq® Reagent Kit V3 150 cycles (manufactured by Illumina, Inc.) was thawed in a water bath, and the HT1 buffer included in the kit was thawed at room temperature and ice-cooled.

The Index PCR product having a concentration known by qPCR was diluted to 4 nM with UltraPure Water. A mixture of 5 µL of this 4 nM dilution of the sample and 5 µL of 0.2N NaOH (prepared by diluting 10 N NaOH aqueous solution (manufactured by FUJIFILM Wako Pure Chemical Corporation) to 0.2N with UltraPure Water) was left to stand at room temperature for 5 minutes. Subsequently, 990 µL of ice-cooled HT1 buffer was added thereto to obtain 1 mL of a 20 pM denatured library.

A mixture of 180 µL of the 20 pM denatured library and 420 µL of ice-cooled HT1 buffer was prepared as 600 µL of a 6 pM library. In addition, a mixture of 30 µL of a 20 pM PhiX DNA denatured in advance and 10 µL of ice-cooled HT1 buffer was prepared as a 15 pM denatured Phix. A mixture of 30 µL of the 15 pM denatured PhiX and 570 µL of the 6 pM denatured library in total of 600 µL was added to "Load Samples" (position 17) of the Reagent Cartridge thawed in a water bath.

7) Starting the Run

Flow Cell washed with Milli-Q® water and 99.5% ethanol was set to Miseq® (manufactured by Illumina, Inc.) subjected to Maintenance Wash with 0.5% Tween 20, and a PR2 bottle and a reagent-carrying cartridge were set, followed by sequencing.

8) Analysis of Gene Information

The Fastq file of the obtained sequence was converted to a Fasta file, all of the obtained sequences were simultaneously translated from the first base of the start codon (ATG) at position 115 to the third base of the cysteine codon (TGC) at position 156 of the library sequence (SEQ ID NO: 195) using software MEGA®. After the translation, the amino acid 7 residues upstream from the terminal cysteine was filtered with cysteine using the filter function of Excel to obtain 3447 peptide aptamer sequences.

9) Selection of Sequence

The obtained 3447 peptide aptamer sequences were subjected to cluster analysis and appearance frequency analysis, and the peptides shown in SEQ ID NOs: 1 to 185 were selected as peptides that specifically bind to norovirus. Among these peptides, Table 16 shows 112 peptide aptamer sequences that fall within the requirements of a hamming distance of 5 or less and forming a cluster including 5 or more sequences, Table 17 shows 48 peptide aptamer sequences that fall within the requirements of a q-gram distance divided into 3-character strings of 4 or less and forming a cluster including 3 or more sequences, and Table 18 shows 36 peptide aptamer sequences having an appearance frequency of 10 or more.

Example 2: Interaction with VLPs

Synthesis of Peptide

Peptides were synthesized by Fmoc solid synthesis in a nitrogen atmosphere using an automated peptide synthesizer Liberty Blue™ (manufactured by CEM Corporation). The resin used was Fmoc-Lys (Mtt)-Wang resin (manufactured by Merck Millipore S.A.S.) or Fmoc-Cys (Trt)-Wang Resin (manufactured by PEPTIDE INSTITUTE, INC.). N,N-Dimethylformamide: DMF (manufactured by FUJIFILM Wako Pure Chemical Corporation) was used as a solvent, and piperidine (manufactured by FUJIFILM Wako Pure Chemical Corporation) diluted with DMF to a predetermined concentration was used as a deprotecting agent. Diisopropylcarbodiimide (manufactured by Tokyo Chemical Industry Co., Ltd.) and ethyl cyanoglyoxylate-2-oxime: Oxyma (manufactured by WATANABE CHEMICAL INDUSTRIES, LTD.) diluted with DMF to predetermined concentrations were used as a coupling reaction accelerator and an optical activity inhibitor, respectively. The synthesis reaction was performed according to the synthesis program provided in the apparatus.

Introduction of Biotin by Manual Synthesis

A synthesis reaction was performed using a manual peptide synthesizer Petisyzer® (manufactured by HiPep Laboratories). Biotin was introduced to the C-terminus side of the tryptophan by using a mixture solution prepared at the following ratio (Table 13) and stirring at room temperature for 1 hour. After the reaction, washing with DMF and diethyl ether was performed.

TABLE 13

| Reagent name | Equivalent |
|---|---|
| HBTU | 5 |
| HOBt | 4.5 |
| Biotin (manufactured by Tokyo Chemical Industry Co., Ltd.) | 5 |
| DIEA | 10 |

<Cleavage of Peptide Attached with Spacer Sequence from Resin>

The resin binding to the peptide added with a spacer sequence was washed with diethyl ether (manufactured by FUJIFILM Wako Pure Chemical Corporation) and dried. This resin was brought into contact with a mixture solution of TFA:TIS:$H_2O$=95:2.5:2.5 at room temperature for 1 hour to cleave the peptide from the resin. The resin was removed from the solution by filtration, and 5 times the amount of ice-cooled diethyl ether was added to the solution, followed by inversion and stirring to generate a precipitate. The generated precipitate was centrifuged at 13,000 rpm for 3 minutes at 20° C., and the precipitate was again washed with diethyl ether and centrifuged under the same conditions. The precipitate was dried in a draft, and the resulting powder was stored at 4° C.

<Evaluation of Interaction by ELISA>

Figure 4:
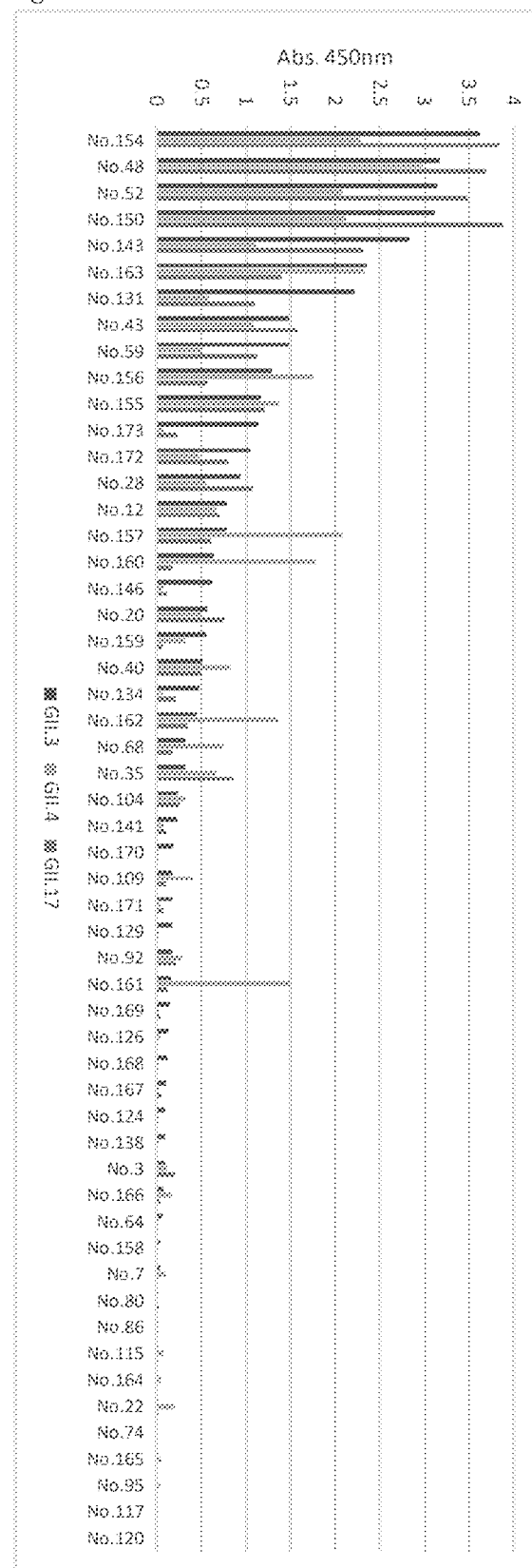
FIG. 4 shows results of evaluation of interaction by ELISA.

The peptide was dispersed in a 10% DMF aqueous solution. The concentration was calculated by an absorptiometer and was adjusted to 50 UM with a 10% DMF aqueous solution. This was added to Pierce™ Streptavidin Coated Plates, Clear, 96-Well (manufactured by Thermo Fisher Scientific) at 100 L/well and was left to stand at room temperature for 1 hour. The supernatant was removed, and after washing with 200 μL of PBS-T (PBS containing 0.05% Tween 20) three times, 100 μL of a GII.3, GII.4, or GII.17 VLP solution diluted to 100 ng/ml with PBS-T was added, followed by leaving to stand at room temperature for 50 minutes. The supernatant was removed, and after washing with 200 μL of PBS-T three times, 100 μL of a rabbit anti-norovirus VLP polyclonal antibody (produced using a mixture of the GII.3 and GII.17 VLPs as an antigen by outsourcing to Eurofins Genomics K.K.) diluted to 1 μg/mL with a blocking agent was added, followed by leaving to stand at room temperature for 50 minutes. The supernatant was removed, and after washing with 200 μL of PBS-T three times, 100 μL of an HRP-labeled anti-rabbit IgG antibody (manufactured by Cell Signaling Technology, Inc.) diluted 1,000-fold with a blocking solution was added, followed by leaving to stand at room temperature for 50 minutes. The supernatant was removed, and after washing with 200 μL of PBS-T three times, 100 μL of 3,3',5,5'-tetramethylbenzidine (manufactured by Abcam plc.) was added, followed by leaving to stand at room temperature for 15 minutes. As a reaction stopping solution, 100 μL of 0.5 M sulfuric acid was added, and the absorbance at 450 nm was measured with a multiplate reader (manufactured by Molecular Devices, LLC.). The results are shown in FIG. 4.

<Calculation of KD Value by Bio-Layer Interferometry: BLI Method>

The apparatus used was BLItz™ (manufactured by ForteBio). The tip of SA chip (manufactured by ForteBio) was kept in contact with purified water for 1 minute for hydration and was then kept in contact with a 1% BSA aqueous solution for 1 hour for blocking. The SA chip subjected to blocking treatment was set to the measuring unit of the BLItz™ main body, and measurement was performed according to the program shown in Table 14. The peptides of SEQ ID NOs: 43, 48, 52, 59, 131, 143, 150, 154, 155, 156, 163, and 172 were used, and the concentration was adjusted to 100 UM. The concentrations of each of the GII.3 and GII.17 VLPs were adjusted to 1 and 0.1 mg/mL. The measurement data were analyzed using the attached software, and the KD value was calculated based on the Ka and Kd values. The results are shown in Table 15.

TABLE 14

| Operation | Used solution | Time [sec] |
|---|---|---|
| Baseline | PBS | 30 |
| Peptide bonding | 100 μM Peptide | 60 |
| Wash | PBS | 30 |
| Association | VLP | 90 |
| Dissociation | PBS | 60 |

TABLE 15

| | GII.3 | | | GII.17 | | |
|---|---|---|---|---|---|---|
| | KD [M] | ka [1/Ms] | kd [1/s] | KD [M] | ka [1/Ms] | kd [1/s] |
| No. 43 | 6.72E−08 | 1.18E+06 | 7.93E−02 | 2.34E−04 | 8.22E+02 | 1.92E−01 |
| No. 48 | 3.03E−08 | 8.10E+05 | 2.46E−02 | 7.66E−08 | 1.28E+06 | 9.78E−02 |
| No. 52 | 1.38E−08 | 7.47E+05 | 1.03E−02 | 1.79E−08 | 1.29E+06 | 2.32E−02 |
| No. 59 | 8.87E−09 | 8.05E+05 | 7.14E−03 | 3.83E−07 | 1.34E+05 | 5.11E−02 |
| No. 131 | 1.57E−04 | 1.66E+03 | 2.62E−01 | | | |
| No. 143 | 1.35E−08 | 3.25E+05 | 4.40E−03 | | | |
| No. 150 | 4.37E−07 | 2.70E+04 | 1.18E−02 | 2.51E−03 | 1.02E+02 | 2.55E−01 |
| No. 154 | 1.23E−07 | 1.41E+05 | 1.73E−02 | 6.28E−07 | 4.95E+04 | 2.05E−03 |
| No. 155 | 8.03E−04 | 1.15E+02 | 9.26E−02 | | | |
| No. 156 | 1.06E−06 | 6.73E+04 | 7.13E−02 | 2.34E−04 | 3.98E+02 | 9.31E−02 |
| No. 163 | 7.66E−09 | 1.03E+06 | 7.86E−03 | 1.68E−07 | 1.10E+05 | 1.85E−02 |
| No. 172 | 6.93E−05 | 1.89E+02 | 1.31E−02 | | | |

TABLE 16

| Cluster | SEQ ID NO: | Sequence |
|---|---|---|
| 1 | 1 | FPSRSSDWLS |
| | 2 | VHRSSDWLS |
| | 3 | VHSRSSDWLS |
| | 4 | VHSRSSDWLR |
| | 5 | VHSRSSDRLR |
| 2 | 6 | KMRAGRSHHA |
| | 7 | KMRAGRSNHA |
| | 8 | KIRAVRSNHA |
| | 9 | KMRSVRSNHA |
| | 10 | KMRAGRSNQA |
| 3 | 11 | VTFFSTSRRN |
| | 12 | VTFSVSNRRF |
| | 13 | VTFSVRNRRV |
| | 14 | VTFSVSTRRF |
| | 15 | VTFSVSNRRG |
| 4 | 16 | GMRTLMCKSY |
| | 17 | GMSPLMCKSY |
| | 18 | GMSTLMCKSE |
| | 19 | GMSTLRCKSE |
| | 20 | GMSTLMCKSY |
| 5 | 21 | KHSTTDLHNK |
| | 22 | KHRPTDRHNK |
| | 23 | KHRTTDRHNK |
| | 24 | THSPTDRHNK |
| | 25 | THRPTDRHNK |
| 6 | 26 | IRNEKGSCVI |
| | 27 | IRNAHVSFVI |
| | 28 | IRNENVSFVI |
| | 29 | IRNEKGSFVI |
| | 30 | IRHENVSFVI |
| 7 | 31 | GRLCRHSTST |
| | 32 | GRLGRHSTST |
| | 33 | GRLSHRSGAG |
| | 34 | GRLSRHTGSV |
| | 35 | GRLSRHSVSG |
| 8 | 36 | VSNVPIRSWI |
| | 37 | VGTVPIRSWI |
| | 38 | VGNVPSRSGR |
| | 39 | VGNVPIRSWL |
| | 40 | VGNVPIRSWI |
| 9 | 41 | YVIRKSDRHN |
| | 42 | YVIRKSDRHI |
| | 43 | YVIRNSDRHN |
| | 44 | YVLRKSDRHN |
| | 45 | YVLRKSDHHN |
| 10 | 46 | ICSRWCPSVQ |
| | 47 | ICSRWSPSGQ |
| | 48 | ICSSWFPSVH |
| | 49 | ICSRWFPSVH |
| | 50 | ICSSWFPSVP |
| 11 | 51 | KYSSTICHTV |
| | 52 | KYRATICHTV |
| | 53 | KYRSTICHTV |
| | 54 | KYRATICYTV |
| | 55 | TSRATICHTV |
| 12 | 56 | SRRSKSEIFV |
| | 57 | YRRSKSETAG |
| | 58 | YRRYKSESVG |
| | 59 | YRRSKSEIFV |
| | 60 | YRRSKSELFV |
| 13 | 61 | HHRHKHKSQM |
| | 62 | HHKHVHTSAM |
| | 63 | HHKHVHTSAI |
| | 64 | HHRKHKHSHM |
| | 65 | HHSHKHTSHM |
| 14 | 66 | NVGFTRVSVH |
| | 67 | NVGFTRVRVH |
| | 68 | NVGNSGVTVH |
| | 69 | NVWNSCVTVH |
| | 70 | TVGNSGVTVH |
| 15 | 71 | RSTPVSMNQP |
| | 72 | RSTPVSMTHP |
| | 73 | RSPPVSMTHP |
| | 74 | RSTPVSMNHP |
| | 75 | SSTPVSMNHP |
| 16 | 76 | IESLDGIQYY |
| | 77 | IESMDGIQHE |
| | 78 | IESMDGIQHF |
| | 79 | IERMDGIQHY |
| | 80 | IESMDGIQHY |
| | 81 | IESLDGIQHY |
| 17 | 82 | MDVIHHNDVS |
| | 83 | RDVRHHNDVS |
| | 84 | RDVSHHNDVF |
| | 85 | RDVSHHNGVS |
| | 86 | RDVSHHNDVS |
| | 87 | RDVIHHNDLS |
| 18 | 88 | GAQFMPFLVV |
| | 89 | GDPFMPFLVV |
| | 90 | GDQFMPILVV |
| | 91 | GDQFLPFLVV |

TABLE 16-continued

| Cluster | SEQ ID NO: | Sequence |
|---|---|---|
|  | 92 | GDQFMPFLVV |
|  | 93 | GDQFMPCWVG |
| 19 | 94 | GALRSVRRDR |
|  | 95 | GDLRSVRRDR |
|  | 96 | GNLRMITRDR |
|  | 97 | GDLRRGRRER |
|  | 98 | GDLRVVRRDR |
|  | 99 | WALRSVRRDR |
| 20 | 100 | DGRAVLVPFR |
|  | 101 | DGSAVLVPFR |
|  | 102 | VGAIAVGVPIR |
|  | 103 | VGLEVGVPIR |
|  | 104 | VGNVVLVPFR |
|  | 105 | VGIEVGPIR |
| 21 | 106 | IGYGSNHNQF |
|  | 107 | IGYGSIHTQF |
|  | 108 | IGYGSIHNPI |
|  | 109 | MGYGSIHNQF |
|  | 110 | IGYGSIHNQF |
|  | 111 | MGYGSSHNQV |
|  | 112 | MGYGSRHNQV |

TABLE 17

| Cluster | SEQ ID NO: | Sequence |
|---|---|---|
| 1 | 77 | IESMDGIQHE |
|  | 78 | IESMDGIQHF |
|  | 80 | IESMDGIQHY |
| 2 | 113 | VLGRSKSGGQ |
|  | 114 | VLGRSKSGWL |
|  | 115 | VLGRSKSGWQ |
| 3 | 116 | NHTRKTSHHQ |
|  | 117 | THTRKTSHHQ |
|  | 118 | TPTRKTSHHQ |
| 4 | 94 | GALRSVRRDR |
|  | 95 | GDLRSVRRDR |
|  | 99 | WALRSVRRDR |
| 5 | 119 | ISSDPFWGRP |
|  | 120 | SSSDPFWGFP |
|  | 121 | SSSDPFWGRL |
| 6 | 122 | SGRPVSTVSA |
|  | 123 | SGRPVSTVRG |
|  | 124 | SGRPVSTVSV |
| 7 | 125 | NRNRARHGSV |
|  | 126 | TRNRARHGSV |
|  | 127 | TRNRARHGSA |
| 8 | 128 | KGGLEKVSRT |
|  | 129 | KGGLEKVSRR |
|  | 130 | KGGLEKVSRI |
| 9 | 131 | NFRVPIRFTH |
|  | 132 | NFRVPIRFTP |
|  | 133 | NFRVPIRFNH |
| 10 | 134 | VSSVMHLSRI |
|  | 135 | VSSVMHLSRT |
|  | 136 | VSSVMHLSLI |
| 11 | 137 | NPMDVGSVVS |
|  | 138 | NHMDMGSVVS |
|  | 139 | THMDMGSVVS |

TABLE 17-continued

| Cluster | SEQ ID NO: | Sequence |
|---|---|---|
| 12 | 140 | DLDYIKSTLH |
|  | 141 | ALDYIKSTLH |
|  | 142 | VLDYIKSTLH |
| 13 | 143 | YVVASKSNRL |
|  | 144 | SVVASKSNRL |
|  | 145 | YVVASKSNRP |
| 14 | 146 | NVRGSSFHRV |
|  | 147 | NVRGSSFHRG |
|  | 148 | TVRGSSFHRV |
| 15 | 149 | VCVDNDISMI |
|  | 150 | VCVDNDISMS |
|  | 151 | VCVDNDISMT |
| 16 | 152 | ECMGRRWMPS |
|  | 153 | ECMGRRWMSR |
|  | 154 | ECMGRRWMSS |

TABLE 18

| SEQ ID NO: | Sequence | Appearance frequency |
|---|---|---|
| 155 | VELFLLTSSC | 42 |
| 156 | VVGFGRRSLF | 19 |
| 157 | VRFHGWFAHV | 18 |
| 158 | GARIRARGRD | 17 |
| 159 | SVVSCVCRAP | 14 |
| 80 | IESMDGIQHY | 14 |
| 160 | NRLWRRGMCI | 13 |
| 161 | TVRCRIGHMR | 12 |
| 162 | YKIRTRRTKR | 12 |
| 163 | SVMVTRSLFG | 12 |
| 164 | SGVKGPSRGI | 12 |
| 86 | RDVSHHNDVS | 12 |
| 165 | GSRHKNLIIP | 12 |
| 166 | IGSRTGGFIG | 12 |
| 167 | DDVRSGTISG | 12 |
| 168 | VTFRNSGRTQ | 11 |
| 3 | VHSRSSDWLS | 11 |
| 169 | SLQHSTTGCR | 11 |
| 170 | GTDTFHRSRA | 11 |
| 7 | KMRAGRSNHA | 11 |
| 171 | GVIAGSGHDL | 11 |
| 172 | GCVGDLYCSA | 11 |
| 173 | CRPGVRLGIF | 11 |
| 174 | VRTHWFGSSR | 10 |

TABLE 18-continued

| SEQ ID NO: | Sequence | Appearance frequency |
| --- | --- | --- |
| 175 | TGPIRDHSSL | 10 |
| 176 | VGRASRWHIS | 10 |
| 177 | TTSWGVVDSF | 10 |
| 178 | TVRSLGITSV | 10 |
| 179 | SKGRHAKRNH | 10 |
| 180 | RIDHSVHGIL | 10 |

TABLE 18-continued

| SEQ ID NO: | Sequence | Appearance frequency |
| --- | --- | --- |
| 181 | NVSHSVRKPI | 10 |
| 182 | RRIDDRILGT | 10 |
| 183 | GSSCVETDGH | 10 |
| 92 | GDQFMPFLVV | 10 |
| 184 | CWGIKRTSIA | 10 |
| 185 | ESNGLHLPLR | 10 |

What is claimed is:

1. A norovirus-binding peptide consisting of an amino acid sequence selected from the group consisting of SEQ ID NOs: 12, 20, 28, 35, 40, 43, 48, 52, 59, 68, 104, 131, 134, 141, 143, 146, 150, 154, 155, 156, 157, 159, 160, 162, 163, 172, and 173.

2. The norovirus-binding peptide according to claim 1, wherein the amino acid sequence is selected from the group consisting of SEQ ID NOs: 43, 48, 52, 59, 143, 154, and 163.

3. A norovirus-binding peptide consisting of the amino acid sequence selected from the group consisting of SEQ ID NOs: 12, 20, 28, 35, 40, 43, 48, 52, 59, 68, 104, 131, 134, 141, 143, 146, 150, 154, 155, 156, 157, 159, 160, 162, 163, 172, and 173 with a cysteine residue added to either or both of an N-terminus and a C-terminus thereof.

4. The norovirus-binding peptide according to claim 3, wherein the cysteine residue is added to the N-terminus and the C-terminus of the peptide.

5. The norovirus-binding peptide according to claim 4, wherein the cysteine residue added to the N-terminus and the cysteine residue added to the C-terminus of the peptide are linked to each other via a disulfide bond to form a cyclic peptide.

6. A norovirus-binding peptide consisting of an amino acid sequence selected from the group consisting of SEQ ID NOs: 12, 20, 28, 35, 40, 43, 48, 52, 59, 68, 104, 131, 134, 141, 143, 146, 150, 154, 155, 156, 157, 159, 160, 162, 163, 172, and 173 with 1 to 20 amino acids added to either or both of the N-terminus and the C-terminus of the peptide.

7. A method for detecting norovirus, the method comprising
(a) bringing a norovirus-binding peptide into contact with a sample that contains or may contain norovirus, and
(b) detecting whether the norovirus-binding peptide that was in contact with the sample bound to norovirus that were in the sample;
wherein the amino acid sequence of the norovirus-binding peptide consists of an amino acid sequence selected from the group consisting of SEQ ID NOs: 12, 20, 28, 35, 40, 43, 48, 52, 59, 68, 104, 131, 134, 141, 143, 146, 150, 154, 155, 156, 157, 159, 160, 162, 163, 172, and 173.

8. A norovirus detection kit comprising the norovirus-binding peptide according to claim 1.

* * * * *

SEQUENCE LISTING

<160> NUMBER OF SEQ ID NOS: 208

<210> SEQ ID NO 1
<211> LENGTH: 10
<212> TYPE: PRT
<213> ORGANISM: Artificial Sequence
<220> FEATURE:
<223> OTHER INFORMATION: Designed peptide

<400> SEQUENCE: 1

Phe Pro Ser Arg Ser Ser Asp Trp Leu Ser
1               5                   10

<210> SEQ ID NO 2
<211> LENGTH: 10
<212> TYPE: PRT
<213> ORGANISM: Artificial Sequence
<220> FEATURE:
<223> OTHER INFORMATION: Designed peptide

<400> SEQUENCE: 2

Val His Arg Arg Ser Ser Asp Trp Leu Ser
1               5                   10

<210> SEQ ID NO 3
<211> LENGTH: 10
<212> TYPE: PRT
<213> ORGANISM: Artificial Sequence
<220> FEATURE:
<223> OTHER INFORMATION: Designed peptide

<400> SEQUENCE: 3

Val His Ser Arg Ser Ser Asp Trp Leu Ser
1               5                   10

<210> SEQ ID NO 4
<211> LENGTH: 10
<212> TYPE: PRT
<213> ORGANISM: Artificial Sequence
<220> FEATURE:
<223> OTHER INFORMATION: Designed peptide

<400> SEQUENCE: 4

Val His Ser Arg Ser Ser Asp Trp Leu Arg
1               5                   10

<210> SEQ ID NO 5
<211> LENGTH: 10
<212> TYPE: PRT
<213> ORGANISM: Artificial Sequence

```
<220> FEATURE:
<223> OTHER INFORMATION: Designed peptide

<400> SEQUENCE: 5

Val His Ser Arg Ser Ser Asp Arg Leu Arg
1               5                   10

<210> SEQ ID NO 6
<211> LENGTH: 10
<212> TYPE: PRT
<213> ORGANISM: Artificial Sequence
<220> FEATURE:
<223> OTHER INFORMATION: Designed peptide

<400> SEQUENCE: 6

Lys Met Arg Ala Gly Arg Ser His His Ala
1               5                   10

<210> SEQ ID NO 7
<211> LENGTH: 10
<212> TYPE: PRT
<213> ORGANISM: Artificial Sequence
<220> FEATURE:
<223> OTHER INFORMATION: Designed peptide

<400> SEQUENCE: 7

Lys Met Arg Ala Gly Arg Ser Asn His Ala
1               5                   10

<210> SEQ ID NO 8
<211> LENGTH: 10
<212> TYPE: PRT
<213> ORGANISM: Artificial Sequence
<220> FEATURE:
<223> OTHER INFORMATION: Designed peptide

<400> SEQUENCE: 8

Lys Ile Arg Ala Val Arg Ser Asn His Ala
1               5                   10

<210> SEQ ID NO 9
<211> LENGTH: 10
<212> TYPE: PRT
<213> ORGANISM: Artificial Sequence
<220> FEATURE:
<223> OTHER INFORMATION: Designed peptide

<400> SEQUENCE: 9

Lys Met Arg Ser Val Arg Ser Asn His Ala
1               5                   10

<210> SEQ ID NO 10
<211> LENGTH: 10
<212> TYPE: PRT
<213> ORGANISM: Artificial Sequence
<220> FEATURE:
<223> OTHER INFORMATION: Designed peptide

<400> SEQUENCE: 10

Lys Met Arg Ala Gly Arg Ser Asn Gln Ala
1               5                   10

<210> SEQ ID NO 11
<211> LENGTH: 10
<212> TYPE: PRT
<213> ORGANISM: Artificial Sequence
<220> FEATURE:
```

<223> OTHER INFORMATION: Designed peptide

<400> SEQUENCE: 11

Val Thr Phe Phe Ser Thr Ser Arg Arg Asn
1               5                   10

<210> SEQ ID NO 12
<211> LENGTH: 10
<212> TYPE: PRT
<213> ORGANISM: Artificial Sequence
<220> FEATURE:
<223> OTHER INFORMATION: Designed peptide

<400> SEQUENCE: 12

Val Thr Phe Ser Val Ser Asn Arg Arg Phe
1               5                   10

<210> SEQ ID NO 13
<211> LENGTH: 10
<212> TYPE: PRT
<213> ORGANISM: Artificial Sequence
<220> FEATURE:
<223> OTHER INFORMATION: Designed peptide

<400> SEQUENCE: 13

Val Thr Phe Ser Val Arg Asn Arg Arg Val
1               5                   10

<210> SEQ ID NO 14
<211> LENGTH: 10
<212> TYPE: PRT
<213> ORGANISM: Artificial Sequence
<220> FEATURE:
<223> OTHER INFORMATION: Designed peptide

<400> SEQUENCE: 14

Val Thr Phe Ser Val Ser Thr Arg Arg Phe
1               5                   10

<210> SEQ ID NO 15
<211> LENGTH: 10
<212> TYPE: PRT
<213> ORGANISM: Artificial Sequence
<220> FEATURE:
<223> OTHER INFORMATION: Designed peptide

<400> SEQUENCE: 15

Val Thr Phe Ser Val Ser Asn Arg Arg Gly
1               5                   10

<210> SEQ ID NO 16
<211> LENGTH: 10
<212> TYPE: PRT
<213> ORGANISM: Artificial Sequence
<220> FEATURE:
<223> OTHER INFORMATION: Designed peptide

<400> SEQUENCE: 16

Gly Met Arg Thr Leu Met Cys Lys Ser Tyr
1               5                   10

<210> SEQ ID NO 17
<211> LENGTH: 10
<212> TYPE: PRT
<213> ORGANISM: Artificial Sequence
<220> FEATURE:
<223> OTHER INFORMATION: Designed peptide

```
<400> SEQUENCE: 17

Gly Met Ser Pro Leu Met Cys Lys Ser Tyr
1               5                   10

<210> SEQ ID NO 18
<211> LENGTH: 10
<212> TYPE: PRT
<213> ORGANISM: Artificial Sequence
<220> FEATURE:
<223> OTHER INFORMATION: Designed peptide

<400> SEQUENCE: 18

Gly Met Ser Thr Leu Met Cys Lys Ser Glu
1               5                   10

<210> SEQ ID NO 19
<211> LENGTH: 10
<212> TYPE: PRT
<213> ORGANISM: Artificial Sequence
<220> FEATURE:
<223> OTHER INFORMATION: Designed peptide

<400> SEQUENCE: 19

Gly Met Ser Thr Leu Arg Cys Lys Ser Glu
1               5                   10

<210> SEQ ID NO 20
<211> LENGTH: 10
<212> TYPE: PRT
<213> ORGANISM: Artificial Sequence
<220> FEATURE:
<223> OTHER INFORMATION: Designed peptide

<400> SEQUENCE: 20

Gly Met Ser Thr Leu Met Cys Lys Ser Tyr
1               5                   10

<210> SEQ ID NO 21
<211> LENGTH: 10
<212> TYPE: PRT
<213> ORGANISM: Artificial Sequence
<220> FEATURE:
<223> OTHER INFORMATION: Designed peptide

<400> SEQUENCE: 21

Lys His Ser Thr Thr Asp Leu His Asn Lys
1               5                   10

<210> SEQ ID NO 22
<211> LENGTH: 10
<212> TYPE: PRT
<213> ORGANISM: Artificial Sequence
<220> FEATURE:
<223> OTHER INFORMATION: Designed peptide

<400> SEQUENCE: 22

Lys His Arg Pro Thr Asp Arg His Asn Lys
1               5                   10

<210> SEQ ID NO 23
<211> LENGTH: 10
<212> TYPE: PRT
<213> ORGANISM: Artificial Sequence
<220> FEATURE:
<223> OTHER INFORMATION: Designed peptide
```

```
<400> SEQUENCE: 23

Lys His Arg Thr Thr Asp Arg His Asn Lys
1               5                   10

<210> SEQ ID NO 24
<211> LENGTH: 10
<212> TYPE: PRT
<213> ORGANISM: Artificial Sequence
<220> FEATURE:
<223> OTHER INFORMATION: Designed peptide

<400> SEQUENCE: 24

Thr His Ser Pro Thr Asp Arg His Asn Lys
1               5                   10

<210> SEQ ID NO 25
<211> LENGTH: 10
<212> TYPE: PRT
<213> ORGANISM: Artificial Sequence
<220> FEATURE:
<223> OTHER INFORMATION: Designed peptide

<400> SEQUENCE: 25

Thr His Arg Pro Thr Asp Arg His Asn Lys
1               5                   10

<210> SEQ ID NO 26
<211> LENGTH: 10
<212> TYPE: PRT
<213> ORGANISM: Artificial Sequence
<220> FEATURE:
<223> OTHER INFORMATION: Designed peptide

<400> SEQUENCE: 26

Ile Arg Asn Glu Lys Gly Ser Cys Val Ile
1               5                   10

<210> SEQ ID NO 27
<211> LENGTH: 10
<212> TYPE: PRT
<213> ORGANISM: Artificial Sequence
<220> FEATURE:
<223> OTHER INFORMATION: Designed peptide

<400> SEQUENCE: 27

Ile Arg Asn Ala His Val Ser Phe Val Ile
1               5                   10

<210> SEQ ID NO 28
<211> LENGTH: 10
<212> TYPE: PRT
<213> ORGANISM: Artificial Sequence
<220> FEATURE:
<223> OTHER INFORMATION: Designed peptide

<400> SEQUENCE: 28

Ile Arg Asn Glu Asn Val Ser Phe Val Ile
1               5                   10

<210> SEQ ID NO 29
<211> LENGTH: 10
<212> TYPE: PRT
<213> ORGANISM: Artificial Sequence
<220> FEATURE:
<223> OTHER INFORMATION: Designed peptide

<400> SEQUENCE: 29
```

```
Ile Arg Asn Glu Lys Gly Ser Phe Val Ile
1               5                   10

<210> SEQ ID NO 30
<211> LENGTH: 10
<212> TYPE: PRT
<213> ORGANISM: Artificial Sequence
<220> FEATURE:
<223> OTHER INFORMATION: Designed peptide

<400> SEQUENCE: 30

Ile Arg His Glu Asn Val Ser Phe Val Ile
1               5                   10

<210> SEQ ID NO 31
<211> LENGTH: 10
<212> TYPE: PRT
<213> ORGANISM: Artificial Sequence
<220> FEATURE:
<223> OTHER INFORMATION: Designed peptide

<400> SEQUENCE: 31

Gly Arg Leu Cys Arg His Ser Thr Ser Thr
1               5                   10

<210> SEQ ID NO 32
<211> LENGTH: 10
<212> TYPE: PRT
<213> ORGANISM: Artificial Sequence
<220> FEATURE:
<223> OTHER INFORMATION: Designed peptide

<400> SEQUENCE: 32

Gly Arg Leu Gly Arg His Ser Thr Ser Thr
1               5                   10

<210> SEQ ID NO 33
<211> LENGTH: 10
<212> TYPE: PRT
<213> ORGANISM: Artificial Sequence
<220> FEATURE:
<223> OTHER INFORMATION: Designed peptide

<400> SEQUENCE: 33

Gly Arg Leu Ser Arg His Ser Gly Ala Gly
1               5                   10

<210> SEQ ID NO 34
<211> LENGTH: 10
<212> TYPE: PRT
<213> ORGANISM: Artificial Sequence
<220> FEATURE:
<223> OTHER INFORMATION: Designed peptide

<400> SEQUENCE: 34

Gly Arg Leu Ser Arg His Thr Gly Ser Val
1               5                   10

<210> SEQ ID NO 35
<211> LENGTH: 10
<212> TYPE: PRT
<213> ORGANISM: Artificial Sequence
<220> FEATURE:
<223> OTHER INFORMATION: Designed peptide

<400> SEQUENCE: 35
```

```
Gly Arg Leu Ser Arg His Ser Val Ser Gly
1               5                   10
```

<210> SEQ ID NO 36
<211> LENGTH: 10
<212> TYPE: PRT
<213> ORGANISM: Artificial Sequence
<220> FEATURE:
<223> OTHER INFORMATION: Designed peptide

<400> SEQUENCE: 36

```
Val Ser Asn Val Pro Ile Arg Ser Trp Ile
1               5                   10
```

<210> SEQ ID NO 37
<211> LENGTH: 10
<212> TYPE: PRT
<213> ORGANISM: Artificial Sequence
<220> FEATURE:
<223> OTHER INFORMATION: Designed peptide

<400> SEQUENCE: 37

```
Val Gly Thr Val Pro Ile Arg Ser Trp Ile
1               5                   10
```

<210> SEQ ID NO 38
<211> LENGTH: 10
<212> TYPE: PRT
<213> ORGANISM: Artificial Sequence
<220> FEATURE:
<223> OTHER INFORMATION: Designed peptide

<400> SEQUENCE: 38

```
Val Gly Asn Val Pro Ser Arg Ser Gly Arg
1               5                   10
```

<210> SEQ ID NO 39
<211> LENGTH: 10
<212> TYPE: PRT
<213> ORGANISM: Artificial Sequence
<220> FEATURE:
<223> OTHER INFORMATION: Designed peptide

<400> SEQUENCE: 39

```
Val Gly Asn Val Pro Ile Arg Ser Trp Leu
1               5                   10
```

<210> SEQ ID NO 40
<211> LENGTH: 10
<212> TYPE: PRT
<213> ORGANISM: Artificial Sequence
<220> FEATURE:
<223> OTHER INFORMATION: Designed peptide

<400> SEQUENCE: 40

```
Val Gly Asn Val Pro Ile Arg Ser Trp Ile
1               5                   10
```

<210> SEQ ID NO 41
<211> LENGTH: 10
<212> TYPE: PRT
<213> ORGANISM: Artificial Sequence
<220> FEATURE:
<223> OTHER INFORMATION: Designed peptide

<400> SEQUENCE: 41

Tyr Val Ile Arg Lys Ser Asp Arg His Asn

```
<210> SEQ ID NO 42
<211> LENGTH: 10
<212> TYPE: PRT
<213> ORGANISM: Artificial Sequence
<220> FEATURE:
<223> OTHER INFORMATION: Designed peptide

<400> SEQUENCE: 42

Tyr Val Ile Arg Lys Ser Asp Arg His Ile
1               5                   10

<210> SEQ ID NO 43
<211> LENGTH: 10
<212> TYPE: PRT
<213> ORGANISM: Artificial Sequence
<220> FEATURE:
<223> OTHER INFORMATION: Designed peptide

<400> SEQUENCE: 43

Tyr Val Ile Arg Asn Ser Asp Arg His Asn
1               5                   10

<210> SEQ ID NO 44
<211> LENGTH: 10
<212> TYPE: PRT
<213> ORGANISM: Artificial Sequence
<220> FEATURE:
<223> OTHER INFORMATION: Designed peptide

<400> SEQUENCE: 44

Tyr Val Leu Arg Lys Ser Asp Arg His Asn
1               5                   10

<210> SEQ ID NO 45
<211> LENGTH: 10
<212> TYPE: PRT
<213> ORGANISM: Artificial Sequence
<220> FEATURE:
<223> OTHER INFORMATION: Designed peptide

<400> SEQUENCE: 45

Tyr Val Leu Arg Lys Ser Asp His His Asn
1               5                   10

<210> SEQ ID NO 46
<211> LENGTH: 10
<212> TYPE: PRT
<213> ORGANISM: Artificial Sequence
<220> FEATURE:
<223> OTHER INFORMATION: Designed peptide

<400> SEQUENCE: 46

Ile Cys Ser Arg Trp Cys Pro Ser Val Gln
1               5                   10

<210> SEQ ID NO 47
<211> LENGTH: 10
<212> TYPE: PRT
<213> ORGANISM: Artificial Sequence
<220> FEATURE:
<223> OTHER INFORMATION: Designed peptide

<400> SEQUENCE: 47

Ile Cys Ser Arg Trp Ser Pro Ser Gly Gln
1               5                   10
```

<210> SEQ ID NO 48
<211> LENGTH: 10
<212> TYPE: PRT
<213> ORGANISM: Artificial Sequence
<220> FEATURE:
<223> OTHER INFORMATION: Designed peptide

<400> SEQUENCE: 48

Ile Cys Ser Ser Trp Phe Pro Ser Val His
1               5                   10

<210> SEQ ID NO 49
<211> LENGTH: 10
<212> TYPE: PRT
<213> ORGANISM: Artificial Sequence
<220> FEATURE:
<223> OTHER INFORMATION: Designed peptide

<400> SEQUENCE: 49

Ile Cys Ser Arg Trp Phe Pro Ser Val His
1               5                   10

<210> SEQ ID NO 50
<211> LENGTH: 10
<212> TYPE: PRT
<213> ORGANISM: Artificial Sequence
<220> FEATURE:
<223> OTHER INFORMATION: Designed peptide

<400> SEQUENCE: 50

Ile Cys Ser Ser Trp Phe Pro Ser Val Pro
1               5                   10

<210> SEQ ID NO 51
<211> LENGTH: 10
<212> TYPE: PRT
<213> ORGANISM: Artificial Sequence
<220> FEATURE:
<223> OTHER INFORMATION: Designed peptide

<400> SEQUENCE: 51

Lys Tyr Ser Ser Thr Ile Cys His Thr Val
1               5                   10

<210> SEQ ID NO 52
<211> LENGTH: 10
<212> TYPE: PRT
<213> ORGANISM: Artificial Sequence
<220> FEATURE:
<223> OTHER INFORMATION: Designed peptide

<400> SEQUENCE: 52

Lys Tyr Arg Ala Thr Ile Cys His Thr Val
1               5                   10

<210> SEQ ID NO 53
<211> LENGTH: 10
<212> TYPE: PRT
<213> ORGANISM: Artificial Sequence
<220> FEATURE:
<223> OTHER INFORMATION: Designed peptide

<400> SEQUENCE: 53

Lys Tyr Arg Ser Thr Ile Cys His Thr Val
1               5                   10

<210> SEQ ID NO 54
<211> LENGTH: 10
<212> TYPE: PRT
<213> ORGANISM: Artificial Sequence
<220> FEATURE:
<223> OTHER INFORMATION: Designed peptide

<400> SEQUENCE: 54

Lys Tyr Arg Ala Thr Ile Cys Tyr Thr Val
1               5                   10

<210> SEQ ID NO 55
<211> LENGTH: 10
<212> TYPE: PRT
<213> ORGANISM: Artificial Sequence
<220> FEATURE:
<223> OTHER INFORMATION: Designed peptide

<400> SEQUENCE: 55

Thr Ser Arg Ala Thr Ile Cys His Thr Val
1               5                   10

<210> SEQ ID NO 56
<211> LENGTH: 10
<212> TYPE: PRT
<213> ORGANISM: Artificial Sequence
<220> FEATURE:
<223> OTHER INFORMATION: Designed peptide

<400> SEQUENCE: 56

Ser Arg Arg Ser Lys Ser Glu Ile Phe Val
1               5                   10

<210> SEQ ID NO 57
<211> LENGTH: 10
<212> TYPE: PRT
<213> ORGANISM: Artificial Sequence
<220> FEATURE:
<223> OTHER INFORMATION: Designed peptide

<400> SEQUENCE: 57

Tyr Arg Arg Ser Lys Ser Glu Thr Ala Gly
1               5                   10

<210> SEQ ID NO 58
<211> LENGTH: 10
<212> TYPE: PRT
<213> ORGANISM: Artificial Sequence
<220> FEATURE:
<223> OTHER INFORMATION: Designed peptide

<400> SEQUENCE: 58

Tyr Arg Arg Tyr Lys Ser Glu Ser Val Gly
1               5                   10

<210> SEQ ID NO 59
<211> LENGTH: 10
<212> TYPE: PRT
<213> ORGANISM: Artificial Sequence
<220> FEATURE:
<223> OTHER INFORMATION: Designed peptide

<400> SEQUENCE: 59

Tyr Arg Arg Ser Lys Ser Glu Ile Phe Val
1               5                   10

<210> SEQ ID NO 60
<211> LENGTH: 10
<212> TYPE: PRT
<213> ORGANISM: Artificial Sequence
<220> FEATURE:
<223> OTHER INFORMATION: Designed peptide

<400> SEQUENCE: 60

Tyr Arg Arg Ser Lys Ser Glu Leu Phe Val
1               5                   10

<210> SEQ ID NO 61
<211> LENGTH: 10
<212> TYPE: PRT
<213> ORGANISM: Artificial Sequence
<220> FEATURE:
<223> OTHER INFORMATION: Designed peptide

<400> SEQUENCE: 61

His His Arg His Lys His Lys Ser Gln Met
1               5                   10

<210> SEQ ID NO 62
<211> LENGTH: 10
<212> TYPE: PRT
<213> ORGANISM: Artificial Sequence
<220> FEATURE:
<223> OTHER INFORMATION: Designed peptide

<400> SEQUENCE: 62

His His Lys His Val His Thr Ser Ala Met
1               5                   10

<210> SEQ ID NO 63
<211> LENGTH: 10
<212> TYPE: PRT
<213> ORGANISM: Artificial Sequence
<220> FEATURE:
<223> OTHER INFORMATION: Designed peptide

<400> SEQUENCE: 63

His His Lys His Val His Thr Ser Ala Ile
1               5                   10

<210> SEQ ID NO 64
<211> LENGTH: 10
<212> TYPE: PRT
<213> ORGANISM: Artificial Sequence
<220> FEATURE:
<223> OTHER INFORMATION: Designed peptide

<400> SEQUENCE: 64

His His Arg His Lys His Lys Ser His Met
1               5                   10

<210> SEQ ID NO 65
<211> LENGTH: 10
<212> TYPE: PRT
<213> ORGANISM: Artificial Sequence
<220> FEATURE:
<223> OTHER INFORMATION: Designed peptide

<400> SEQUENCE: 65

His His Ser His Lys His Thr Ser His Met
1               5                   10

<210> SEQ ID NO 66

```
<211> LENGTH: 10
<212> TYPE: PRT
<213> ORGANISM: Artificial Sequence
<220> FEATURE:
<223> OTHER INFORMATION: Designed peptide

<400> SEQUENCE: 66

Asn Val Gly Phe Thr Arg Val Ser Val His
1               5                   10

<210> SEQ ID NO 67
<211> LENGTH: 10
<212> TYPE: PRT
<213> ORGANISM: Artificial Sequence
<220> FEATURE:
<223> OTHER INFORMATION: Designed peptide

<400> SEQUENCE: 67

Asn Val Gly Phe Thr Arg Val Arg Val His
1               5                   10

<210> SEQ ID NO 68
<211> LENGTH: 10
<212> TYPE: PRT
<213> ORGANISM: Artificial Sequence
<220> FEATURE:
<223> OTHER INFORMATION: Designed peptide

<400> SEQUENCE: 68

Asn Val Gly Asn Ser Gly Val Thr Val His
1               5                   10

<210> SEQ ID NO 69
<211> LENGTH: 10
<212> TYPE: PRT
<213> ORGANISM: Artificial Sequence
<220> FEATURE:
<223> OTHER INFORMATION: Designed peptide

<400> SEQUENCE: 69

Asn Val Trp Asn Ser Cys Val Thr Val His
1               5                   10

<210> SEQ ID NO 70
<211> LENGTH: 10
<212> TYPE: PRT
<213> ORGANISM: Artificial Sequence
<220> FEATURE:
<223> OTHER INFORMATION: Designed peptide

<400> SEQUENCE: 70

Thr Val Gly Asn Ser Gly Val Thr Val His
1               5                   10

<210> SEQ ID NO 71
<211> LENGTH: 10
<212> TYPE: PRT
<213> ORGANISM: Artificial Sequence
<220> FEATURE:
<223> OTHER INFORMATION: Designed peptide

<400> SEQUENCE: 71

Arg Ser Thr Pro Val Ser Met Asn Gln Pro
1               5                   10

<210> SEQ ID NO 72
<211> LENGTH: 10
```

```
<212> TYPE: PRT
<213> ORGANISM: Artificial Sequence
<220> FEATURE:
<223> OTHER INFORMATION: Designed peptide

<400> SEQUENCE: 72

Arg Ser Thr Pro Val Ser Met Thr His Pro
1               5                   10

<210> SEQ ID NO 73
<211> LENGTH: 10
<212> TYPE: PRT
<213> ORGANISM: Artificial Sequence
<220> FEATURE:
<223> OTHER INFORMATION: Designed peptide

<400> SEQUENCE: 73

Arg Ser Pro Pro Val Ser Met Thr His Pro
1               5                   10

<210> SEQ ID NO 74
<211> LENGTH: 10
<212> TYPE: PRT
<213> ORGANISM: Artificial Sequence
<220> FEATURE:
<223> OTHER INFORMATION: Designed peptide

<400> SEQUENCE: 74

Arg Ser Thr Pro Val Ser Met Asn His Pro
1               5                   10

<210> SEQ ID NO 75
<211> LENGTH: 10
<212> TYPE: PRT
<213> ORGANISM: Artificial Sequence
<220> FEATURE:
<223> OTHER INFORMATION: Designed peptide

<400> SEQUENCE: 75

Ser Ser Thr Pro Val Ser Met Asn His Pro
1               5                   10

<210> SEQ ID NO 76
<211> LENGTH: 10
<212> TYPE: PRT
<213> ORGANISM: Artificial Sequence
<220> FEATURE:
<223> OTHER INFORMATION: Designed peptide

<400> SEQUENCE: 76

Ile Glu Ser Leu Asp Gly Ile Gln Tyr Tyr
1               5                   10

<210> SEQ ID NO 77
<211> LENGTH: 10
<212> TYPE: PRT
<213> ORGANISM: Artificial Sequence
<220> FEATURE:
<223> OTHER INFORMATION: Designed peptide

<400> SEQUENCE: 77

Ile Glu Ser Met Asp Gly Ile Gln His Glu
1               5                   10

<210> SEQ ID NO 78
<211> LENGTH: 10
<212> TYPE: PRT
```

```
<213> ORGANISM: Artificial Sequence
<220> FEATURE:
<223> OTHER INFORMATION: Designed peptide

<400> SEQUENCE: 78

Ile Glu Ser Met Asp Gly Ile Gln His Phe
1               5                   10

<210> SEQ ID NO 79
<211> LENGTH: 10
<212> TYPE: PRT
<213> ORGANISM: Artificial Sequence
<220> FEATURE:
<223> OTHER INFORMATION: Designed peptide

<400> SEQUENCE: 79

Ile Glu Arg Met Asp Gly Ile Gln His Tyr
1               5                   10

<210> SEQ ID NO 80
<211> LENGTH: 10
<212> TYPE: PRT
<213> ORGANISM: Artificial Sequence
<220> FEATURE:
<223> OTHER INFORMATION: Designed peptide

<400> SEQUENCE: 80

Ile Glu Ser Met Asp Gly Ile Gln His Tyr
1               5                   10

<210> SEQ ID NO 81
<211> LENGTH: 10
<212> TYPE: PRT
<213> ORGANISM: Artificial Sequence
<220> FEATURE:
<223> OTHER INFORMATION: Designed peptide

<400> SEQUENCE: 81

Ile Glu Ser Leu Asp Gly Ile Gln His Tyr
1               5                   10

<210> SEQ ID NO 82
<211> LENGTH: 10
<212> TYPE: PRT
<213> ORGANISM: Artificial Sequence
<220> FEATURE:
<223> OTHER INFORMATION: Designed peptide

<400> SEQUENCE: 82

Met Asp Val Ile His His Asn Asp Val Ser
1               5                   10

<210> SEQ ID NO 83
<211> LENGTH: 10
<212> TYPE: PRT
<213> ORGANISM: Artificial Sequence
<220> FEATURE:
<223> OTHER INFORMATION: Designed peptide

<400> SEQUENCE: 83

Arg Asp Val Arg His His Asn Asp Val Ser
1               5                   10

<210> SEQ ID NO 84
<211> LENGTH: 10
<212> TYPE: PRT
<213> ORGANISM: Artificial Sequence
```

```
<220> FEATURE:
<223> OTHER INFORMATION: Designed peptide

<400> SEQUENCE: 84

Arg Asp Val Ser His His Asn Asp Val Phe
1               5                   10

<210> SEQ ID NO 85
<211> LENGTH: 10
<212> TYPE: PRT
<213> ORGANISM: Artificial Sequence
<220> FEATURE:
<223> OTHER INFORMATION: Designed peptide

<400> SEQUENCE: 85

Arg Asp Val Ser His His Asn Gly Val Ser
1               5                   10

<210> SEQ ID NO 86
<211> LENGTH: 10
<212> TYPE: PRT
<213> ORGANISM: Artificial Sequence
<220> FEATURE:
<223> OTHER INFORMATION: Designed peptide

<400> SEQUENCE: 86

Arg Asp Val Ser His His Asn Asp Val Ser
1               5                   10

<210> SEQ ID NO 87
<211> LENGTH: 10
<212> TYPE: PRT
<213> ORGANISM: Artificial Sequence
<220> FEATURE:
<223> OTHER INFORMATION: Designed peptide

<400> SEQUENCE: 87

Arg Asp Val Ile His His Asn Asp Leu Ser
1               5                   10

<210> SEQ ID NO 88
<211> LENGTH: 10
<212> TYPE: PRT
<213> ORGANISM: Artificial Sequence
<220> FEATURE:
<223> OTHER INFORMATION: Designed peptide

<400> SEQUENCE: 88

Gly Ala Gln Phe Met Pro Phe Leu Val Val
1               5                   10

<210> SEQ ID NO 89
<211> LENGTH: 10
<212> TYPE: PRT
<213> ORGANISM: Artificial Sequence
<220> FEATURE:
<223> OTHER INFORMATION: Designed peptide

<400> SEQUENCE: 89

Gly Asp Pro Phe Met Pro Phe Leu Val Val
1               5                   10

<210> SEQ ID NO 90
<211> LENGTH: 10
<212> TYPE: PRT
<213> ORGANISM: Artificial Sequence
<220> FEATURE:
```

<223> OTHER INFORMATION: Designed peptide

<400> SEQUENCE: 90

Gly Asp Gln Phe Met Pro Ile Leu Val Val
1               5                   10

<210> SEQ ID NO 91
<211> LENGTH: 10
<212> TYPE: PRT
<213> ORGANISM: Artificial Sequence
<220> FEATURE:
<223> OTHER INFORMATION: Designed peptide

<400> SEQUENCE: 91

Gly Asp Gln Phe Leu Pro Phe Leu Val Val
1               5                   10

<210> SEQ ID NO 92
<211> LENGTH: 10
<212> TYPE: PRT
<213> ORGANISM: Artificial Sequence
<220> FEATURE:
<223> OTHER INFORMATION: Designed peptide

<400> SEQUENCE: 92

Gly Asp Gln Phe Met Pro Phe Leu Val Val
1               5                   10

<210> SEQ ID NO 93
<211> LENGTH: 10
<212> TYPE: PRT
<213> ORGANISM: Artificial Sequence
<220> FEATURE:
<223> OTHER INFORMATION: Designed peptide

<400> SEQUENCE: 93

Gly Asp Gln Phe Met Pro Cys Trp Val Gly
1               5                   10

<210> SEQ ID NO 94
<211> LENGTH: 10
<212> TYPE: PRT
<213> ORGANISM: Artificial Sequence
<220> FEATURE:
<223> OTHER INFORMATION: Designed peptide

<400> SEQUENCE: 94

Gly Ala Leu Arg Ser Val Arg Arg Asp Arg
1               5                   10

<210> SEQ ID NO 95
<211> LENGTH: 10
<212> TYPE: PRT
<213> ORGANISM: Artificial Sequence
<220> FEATURE:
<223> OTHER INFORMATION: Designed peptide

<400> SEQUENCE: 95

Gly Asp Leu Arg Ser Val Arg Arg Asp Arg
1               5                   10

<210> SEQ ID NO 96
<211> LENGTH: 10
<212> TYPE: PRT
<213> ORGANISM: Artificial Sequence
<220> FEATURE:
<223> OTHER INFORMATION: Designed peptide

```
<400> SEQUENCE: 96

Gly Asn Leu Arg Met Ile Thr Arg Asp Arg
1               5                   10

<210> SEQ ID NO 97
<211> LENGTH: 10
<212> TYPE: PRT
<213> ORGANISM: Artificial Sequence
<220> FEATURE:
<223> OTHER INFORMATION: Designed peptide

<400> SEQUENCE: 97

Gly Asp Leu Arg Arg Gly Arg Arg Glu Arg
1               5                   10

<210> SEQ ID NO 98
<211> LENGTH: 10
<212> TYPE: PRT
<213> ORGANISM: Artificial Sequence
<220> FEATURE:
<223> OTHER INFORMATION: Designed peptide

<400> SEQUENCE: 98

Gly Asp Leu Arg Arg Val Arg Arg Asp Arg
1               5                   10

<210> SEQ ID NO 99
<211> LENGTH: 10
<212> TYPE: PRT
<213> ORGANISM: Artificial Sequence
<220> FEATURE:
<223> OTHER INFORMATION: Designed peptide

<400> SEQUENCE: 99

Trp Ala Leu Arg Ser Val Arg Arg Asp Arg
1               5                   10

<210> SEQ ID NO 100
<211> LENGTH: 10
<212> TYPE: PRT
<213> ORGANISM: Artificial Sequence
<220> FEATURE:
<223> OTHER INFORMATION: Designed peptide

<400> SEQUENCE: 100

Asp Gly Arg Ala Val Leu Val Pro Phe Arg
1               5                   10

<210> SEQ ID NO 101
<211> LENGTH: 10
<212> TYPE: PRT
<213> ORGANISM: Artificial Sequence
<220> FEATURE:
<223> OTHER INFORMATION: Designed peptide

<400> SEQUENCE: 101

Asp Gly Ser Ala Val Leu Val Pro Phe Arg
1               5                   10

<210> SEQ ID NO 102
<211> LENGTH: 10
<212> TYPE: PRT
<213> ORGANISM: Artificial Sequence
<220> FEATURE:
<223> OTHER INFORMATION: Designed peptide
```

<400> SEQUENCE: 102

Val Gly Ile Ala Val Gly Val Pro Ile Arg
1               5                   10

<210> SEQ ID NO 103
<211> LENGTH: 10
<212> TYPE: PRT
<213> ORGANISM: Artificial Sequence
<220> FEATURE:
<223> OTHER INFORMATION: Designed peptide

<400> SEQUENCE: 103

Val Gly Leu Glu Val Gly Val Pro Ile Arg
1               5                   10

<210> SEQ ID NO 104
<211> LENGTH: 10
<212> TYPE: PRT
<213> ORGANISM: Artificial Sequence
<220> FEATURE:
<223> OTHER INFORMATION: Designed peptide

<400> SEQUENCE: 104

Val Gly Asn Val Val Leu Val Pro Phe Arg
1               5                   10

<210> SEQ ID NO 105
<211> LENGTH: 10
<212> TYPE: PRT
<213> ORGANISM: Artificial Sequence
<220> FEATURE:
<223> OTHER INFORMATION: Designed peptide

<400> SEQUENCE: 105

Val Gly Ile Glu Val Gly Val Pro Ile Arg
1               5                   10

<210> SEQ ID NO 106
<211> LENGTH: 10
<212> TYPE: PRT
<213> ORGANISM: Artificial Sequence
<220> FEATURE:
<223> OTHER INFORMATION: Designed peptide

<400> SEQUENCE: 106

Ile Gly Tyr Gly Ser Asn His Asn Gln Phe
1               5                   10

<210> SEQ ID NO 107
<211> LENGTH: 10
<212> TYPE: PRT
<213> ORGANISM: Artificial Sequence
<220> FEATURE:
<223> OTHER INFORMATION: Designed peptide

<400> SEQUENCE: 107

Ile Gly Tyr Gly Ser Ile His Thr Gln Phe
1               5                   10

<210> SEQ ID NO 108
<211> LENGTH: 10
<212> TYPE: PRT
<213> ORGANISM: Artificial Sequence
<220> FEATURE:
<223> OTHER INFORMATION: Designed peptide

<400> SEQUENCE: 108

```
Ile Gly Tyr Gly Ser Ile His Asn Pro Ile
1               5                   10
```

<210> SEQ ID NO 109
<211> LENGTH: 10
<212> TYPE: PRT
<213> ORGANISM: Artificial Sequence
<220> FEATURE:
<223> OTHER INFORMATION: Designed peptide

<400> SEQUENCE: 109

```
Met Gly Tyr Gly Ser Ile His Asn Gln Phe
1               5                   10
```

<210> SEQ ID NO 110
<211> LENGTH: 10
<212> TYPE: PRT
<213> ORGANISM: Artificial Sequence
<220> FEATURE:
<223> OTHER INFORMATION: Designed peptide

<400> SEQUENCE: 110

```
Ile Gly Tyr Gly Ser Ile His Asn Gln Phe
1               5                   10
```

<210> SEQ ID NO 111
<211> LENGTH: 10
<212> TYPE: PRT
<213> ORGANISM: Artificial Sequence
<220> FEATURE:
<223> OTHER INFORMATION: Designed peptide

<400> SEQUENCE: 111

```
Met Gly Tyr Gly Ser Ser His Asn Gln Val
1               5                   10
```

<210> SEQ ID NO 112
<211> LENGTH: 10
<212> TYPE: PRT
<213> ORGANISM: Artificial Sequence
<220> FEATURE:
<223> OTHER INFORMATION: Designed peptide

<400> SEQUENCE: 112

```
Met Gly Tyr Gly Ser Arg His Asn Gln Val
1               5                   10
```

<210> SEQ ID NO 113
<211> LENGTH: 10
<212> TYPE: PRT
<213> ORGANISM: Artificial Sequence
<220> FEATURE:
<223> OTHER INFORMATION: Designed peptide

<400> SEQUENCE: 113

```
Val Leu Gly Arg Ser Lys Ser Gly Gly Gln
1               5                   10
```

<210> SEQ ID NO 114
<211> LENGTH: 10
<212> TYPE: PRT
<213> ORGANISM: Artificial Sequence
<220> FEATURE:
<223> OTHER INFORMATION: Designed peptide

<400> SEQUENCE: 114

Val Leu Gly Arg Ser Lys Ser Gly Trp Leu
1               5                   10

<210> SEQ ID NO 115
<211> LENGTH: 10
<212> TYPE: PRT
<213> ORGANISM: Artificial Sequence
<220> FEATURE:
<223> OTHER INFORMATION: Designed peptide

<400> SEQUENCE: 115

Val Leu Gly Arg Ser Lys Ser Gly Trp Gln
1               5                   10

<210> SEQ ID NO 116
<211> LENGTH: 10
<212> TYPE: PRT
<213> ORGANISM: Artificial Sequence
<220> FEATURE:
<223> OTHER INFORMATION: Designed peptide

<400> SEQUENCE: 116

Asn His Thr Arg Lys Thr Ser His His Gln
1               5                   10

<210> SEQ ID NO 117
<211> LENGTH: 10
<212> TYPE: PRT
<213> ORGANISM: Artificial Sequence
<220> FEATURE:
<223> OTHER INFORMATION: Designed peptide

<400> SEQUENCE: 117

Thr His Thr Arg Lys Thr Ser His His Gln
1               5                   10

<210> SEQ ID NO 118
<211> LENGTH: 10
<212> TYPE: PRT
<213> ORGANISM: Artificial Sequence
<220> FEATURE:
<223> OTHER INFORMATION: Designed peptide

<400> SEQUENCE: 118

Thr Pro Thr Arg Lys Thr Ser His His Gln
1               5                   10

<210> SEQ ID NO 119
<211> LENGTH: 10
<212> TYPE: PRT
<213> ORGANISM: Artificial Sequence
<220> FEATURE:
<223> OTHER INFORMATION: Designed peptide

<400> SEQUENCE: 119

Ile Ser Ser Asp Pro Phe Trp Gly Arg Pro
1               5                   10

<210> SEQ ID NO 120
<211> LENGTH: 10
<212> TYPE: PRT
<213> ORGANISM: Artificial Sequence
<220> FEATURE:
<223> OTHER INFORMATION: Designed peptide

<400> SEQUENCE: 120

Ser Ser Ser Asp Pro Phe Trp Gly Arg Pro

```
1               5                   10
```

<210> SEQ ID NO 121
<211> LENGTH: 10
<212> TYPE: PRT
<213> ORGANISM: Artificial Sequence
<220> FEATURE:
<223> OTHER INFORMATION: Designed peptide

<400> SEQUENCE: 121

```
Ser Ser Ser Asp Pro Phe Trp Gly Arg Leu
1               5                   10
```

<210> SEQ ID NO 122
<211> LENGTH: 10
<212> TYPE: PRT
<213> ORGANISM: Artificial Sequence
<220> FEATURE:
<223> OTHER INFORMATION: Designed peptide

<400> SEQUENCE: 122

```
Ser Gly Arg Pro Val Ser Thr Val Ser Ala
1               5                   10
```

<210> SEQ ID NO 123
<211> LENGTH: 10
<212> TYPE: PRT
<213> ORGANISM: Artificial Sequence
<220> FEATURE:
<223> OTHER INFORMATION: Designed peptide

<400> SEQUENCE: 123

```
Ser Gly Arg Pro Val Ser Thr Val Arg Gly
1               5                   10
```

<210> SEQ ID NO 124
<211> LENGTH: 10
<212> TYPE: PRT
<213> ORGANISM: Artificial Sequence
<220> FEATURE:
<223> OTHER INFORMATION: Designed peptide

<400> SEQUENCE: 124

```
Ser Gly Arg Pro Val Ser Thr Val Ser Val
1               5                   10
```

<210> SEQ ID NO 125
<211> LENGTH: 10
<212> TYPE: PRT
<213> ORGANISM: Artificial Sequence
<220> FEATURE:
<223> OTHER INFORMATION: Designed peptide

<400> SEQUENCE: 125

```
Asn Arg Asn Arg Ala Arg His Gly Ser Val
1               5                   10
```

<210> SEQ ID NO 126
<211> LENGTH: 10
<212> TYPE: PRT
<213> ORGANISM: Artificial Sequence
<220> FEATURE:
<223> OTHER INFORMATION: Designed peptide

<400> SEQUENCE: 126

```
Thr Arg Asn Arg Ala Arg His Gly Ser Val
1               5                   10
```

<210> SEQ ID NO 127
<211> LENGTH: 10
<212> TYPE: PRT
<213> ORGANISM: Artificial Sequence
<220> FEATURE:
<223> OTHER INFORMATION: Designed peptide

<400> SEQUENCE: 127

Thr Arg Asn Arg Ala Arg His Gly Ser Ala
1               5                   10

<210> SEQ ID NO 128
<211> LENGTH: 10
<212> TYPE: PRT
<213> ORGANISM: Artificial Sequence
<220> FEATURE:
<223> OTHER INFORMATION: Designed peptide

<400> SEQUENCE: 128

Lys Gly Gly Leu Glu Lys Val Ser Arg Thr
1               5                   10

<210> SEQ ID NO 129
<211> LENGTH: 10
<212> TYPE: PRT
<213> ORGANISM: Artificial Sequence
<220> FEATURE:
<223> OTHER INFORMATION: Designed peptide

<400> SEQUENCE: 129

Lys Gly Gly Leu Glu Lys Val Ser Arg Arg
1               5                   10

<210> SEQ ID NO 130
<211> LENGTH: 10
<212> TYPE: PRT
<213> ORGANISM: Artificial Sequence
<220> FEATURE:
<223> OTHER INFORMATION: Designed peptide

<400> SEQUENCE: 130

Lys Gly Gly Leu Glu Lys Val Ser Arg Ile
1               5                   10

<210> SEQ ID NO 131
<211> LENGTH: 10
<212> TYPE: PRT
<213> ORGANISM: Artificial Sequence
<220> FEATURE:
<223> OTHER INFORMATION: Designed peptide

<400> SEQUENCE: 131

Asn Phe Arg Val Pro Ile Arg Phe Thr His
1               5                   10

<210> SEQ ID NO 132
<211> LENGTH: 10
<212> TYPE: PRT
<213> ORGANISM: Artificial Sequence
<220> FEATURE:
<223> OTHER INFORMATION: Designed peptide

<400> SEQUENCE: 132

Asn Phe Arg Val Pro Ile Arg Phe Thr Pro
1               5                   10

<210> SEQ ID NO 133
<211> LENGTH: 10
<212> TYPE: PRT
<213> ORGANISM: Artificial Sequence
<220> FEATURE:
<223> OTHER INFORMATION: Designed peptide

<400> SEQUENCE: 133

Asn Phe Arg Val Pro Ile Arg Phe Asn His
1               5                   10

<210> SEQ ID NO 134
<211> LENGTH: 10
<212> TYPE: PRT
<213> ORGANISM: Artificial Sequence
<220> FEATURE:
<223> OTHER INFORMATION: Designed peptide

<400> SEQUENCE: 134

Val Ser Ser Val Met His Leu Ser Arg Ile
1               5                   10

<210> SEQ ID NO 135
<211> LENGTH: 10
<212> TYPE: PRT
<213> ORGANISM: Artificial Sequence
<220> FEATURE:
<223> OTHER INFORMATION: Designed peptide

<400> SEQUENCE: 135

Val Ser Ser Val Met His Leu Ser Arg Thr
1               5                   10

<210> SEQ ID NO 136
<211> LENGTH: 10
<212> TYPE: PRT
<213> ORGANISM: Artificial Sequence
<220> FEATURE:
<223> OTHER INFORMATION: Designed peptide

<400> SEQUENCE: 136

Val Ser Ser Val Met His Leu Ser Leu Ile
1               5                   10

<210> SEQ ID NO 137
<211> LENGTH: 10
<212> TYPE: PRT
<213> ORGANISM: Artificial Sequence
<220> FEATURE:
<223> OTHER INFORMATION: Designed peptide

<400> SEQUENCE: 137

Asn Pro Met Asp Met Gly Ser Val Val Ser
1               5                   10

<210> SEQ ID NO 138
<211> LENGTH: 10
<212> TYPE: PRT
<213> ORGANISM: Artificial Sequence
<220> FEATURE:
<223> OTHER INFORMATION: Designed peptide

<400> SEQUENCE: 138

Asn His Met Asp Met Gly Ser Val Val Ser
1               5                   10

```
<210> SEQ ID NO 139
<211> LENGTH: 10
<212> TYPE: PRT
<213> ORGANISM: Artificial Sequence
<220> FEATURE:
<223> OTHER INFORMATION: Designed peptide

<400> SEQUENCE: 139

Thr His Met Asp Met Gly Ser Val Val Ser
1               5                   10

<210> SEQ ID NO 140
<211> LENGTH: 10
<212> TYPE: PRT
<213> ORGANISM: Artificial Sequence
<220> FEATURE:
<223> OTHER INFORMATION: Designed peptide

<400> SEQUENCE: 140

Asp Leu Asp Tyr Ile Lys Ser Thr Leu His
1               5                   10

<210> SEQ ID NO 141
<211> LENGTH: 10
<212> TYPE: PRT
<213> ORGANISM: Artificial Sequence
<220> FEATURE:
<223> OTHER INFORMATION: Designed peptide

<400> SEQUENCE: 141

Ala Leu Asp Tyr Ile Lys Ser Thr Leu His
1               5                   10

<210> SEQ ID NO 142
<211> LENGTH: 10
<212> TYPE: PRT
<213> ORGANISM: Artificial Sequence
<220> FEATURE:
<223> OTHER INFORMATION: Designed peptide

<400> SEQUENCE: 142

Val Leu Asp Tyr Ile Lys Ser Thr Leu His
1               5                   10

<210> SEQ ID NO 143
<211> LENGTH: 10
<212> TYPE: PRT
<213> ORGANISM: Artificial Sequence
<220> FEATURE:
<223> OTHER INFORMATION: Designed peptide

<400> SEQUENCE: 143

Tyr Val Val Ala Ser Lys Ser Asn Arg Leu
1               5                   10

<210> SEQ ID NO 144
<211> LENGTH: 10
<212> TYPE: PRT
<213> ORGANISM: Artificial Sequence
<220> FEATURE:
<223> OTHER INFORMATION: Designed peptide

<400> SEQUENCE: 144

Ser Val Val Ala Ser Lys Ser Asn Arg Leu
1               5                   10

<210> SEQ ID NO 145
```

```
<211> LENGTH: 10
<212> TYPE: PRT
<213> ORGANISM: Artificial Sequence
<220> FEATURE:
<223> OTHER INFORMATION: Designed peptide

<400> SEQUENCE: 145

Tyr Val Val Ala Ser Lys Ser Asn Arg Pro
1               5                   10

<210> SEQ ID NO 146
<211> LENGTH: 10
<212> TYPE: PRT
<213> ORGANISM: Artificial Sequence
<220> FEATURE:
<223> OTHER INFORMATION: Designed peptide

<400> SEQUENCE: 146

Asn Val Arg Gly Ser Ser Phe His Arg Val
1               5                   10

<210> SEQ ID NO 147
<211> LENGTH: 10
<212> TYPE: PRT
<213> ORGANISM: Artificial Sequence
<220> FEATURE:
<223> OTHER INFORMATION: Designed peptide

<400> SEQUENCE: 147

Asn Val Arg Gly Ser Ser Phe His Arg Gly
1               5                   10

<210> SEQ ID NO 148
<211> LENGTH: 10
<212> TYPE: PRT
<213> ORGANISM: Artificial Sequence
<220> FEATURE:
<223> OTHER INFORMATION: Designed peptide

<400> SEQUENCE: 148

Thr Val Arg Gly Ser Ser Phe His Arg Val
1               5                   10

<210> SEQ ID NO 149
<211> LENGTH: 10
<212> TYPE: PRT
<213> ORGANISM: Artificial Sequence
<220> FEATURE:
<223> OTHER INFORMATION: Designed peptide

<400> SEQUENCE: 149

Val Cys Val Asp Asn Asp Ile Ser Met Ile
1               5                   10

<210> SEQ ID NO 150
<211> LENGTH: 10
<212> TYPE: PRT
<213> ORGANISM: Artificial Sequence
<220> FEATURE:
<223> OTHER INFORMATION: Designed peptide

<400> SEQUENCE: 150

Val Cys Val Asp Asn Asp Ile Ser Met Ser
1               5                   10

<210> SEQ ID NO 151
<211> LENGTH: 10
```

```
<212> TYPE: PRT
<213> ORGANISM: Artificial Sequence
<220> FEATURE:
<223> OTHER INFORMATION: Designed peptide

<400> SEQUENCE: 151

Val Cys Val Asp Asn Asp Ile Ser Met Thr
1               5                   10

<210> SEQ ID NO 152
<211> LENGTH: 10
<212> TYPE: PRT
<213> ORGANISM: Artificial Sequence
<220> FEATURE:
<223> OTHER INFORMATION: Designed peptide

<400> SEQUENCE: 152

Glu Cys Met Gly Arg Arg Trp Met Pro Ser
1               5                   10

<210> SEQ ID NO 153
<211> LENGTH: 10
<212> TYPE: PRT
<213> ORGANISM: Artificial Sequence
<220> FEATURE:
<223> OTHER INFORMATION: Designed peptide

<400> SEQUENCE: 153

Glu Cys Met Gly Arg Arg Trp Met Ser Arg
1               5                   10

<210> SEQ ID NO 154
<211> LENGTH: 10
<212> TYPE: PRT
<213> ORGANISM: Artificial Sequence
<220> FEATURE:
<223> OTHER INFORMATION: Designed peptide

<400> SEQUENCE: 154

Glu Cys Met Gly Arg Arg Trp Met Ser Ser
1               5                   10

<210> SEQ ID NO 155
<211> LENGTH: 10
<212> TYPE: PRT
<213> ORGANISM: Artificial Sequence
<220> FEATURE:
<223> OTHER INFORMATION: Designed peptide

<400> SEQUENCE: 155

Val Glu Leu Phe Leu Leu Thr Ser Ser Cys
1               5                   10

<210> SEQ ID NO 156
<211> LENGTH: 10
<212> TYPE: PRT
<213> ORGANISM: Artificial Sequence
<220> FEATURE:
<223> OTHER INFORMATION: Designed peptide

<400> SEQUENCE: 156

Val Val Gly Phe Gly Arg Arg Ser Leu Phe
1               5                   10

<210> SEQ ID NO 157
<211> LENGTH: 10
<212> TYPE: PRT
```

```
<213> ORGANISM: Artificial Sequence
<220> FEATURE:
<223> OTHER INFORMATION: Designed peptide

<400> SEQUENCE: 157

Val Arg Phe His Gly Trp Phe Ala His Val
1               5                   10

<210> SEQ ID NO 158
<211> LENGTH: 10
<212> TYPE: PRT
<213> ORGANISM: Artificial Sequence
<220> FEATURE:
<223> OTHER INFORMATION: Designed peptide

<400> SEQUENCE: 158

Gly Ala Arg Ile Arg Ala Arg Gly Arg Asp
1               5                   10

<210> SEQ ID NO 159
<211> LENGTH: 10
<212> TYPE: PRT
<213> ORGANISM: Artificial Sequence
<220> FEATURE:
<223> OTHER INFORMATION: Designed peptide

<400> SEQUENCE: 159

Ser Val Val Ser Cys Val Cys Arg Ala Pro
1               5                   10

<210> SEQ ID NO 160
<211> LENGTH: 10
<212> TYPE: PRT
<213> ORGANISM: Artificial Sequence
<220> FEATURE:
<223> OTHER INFORMATION: Designed peptide

<400> SEQUENCE: 160

Asn Arg Leu Trp Arg Arg Gly Met Cys Ile
1               5                   10

<210> SEQ ID NO 161
<211> LENGTH: 10
<212> TYPE: PRT
<213> ORGANISM: Artificial Sequence
<220> FEATURE:
<223> OTHER INFORMATION: Designed peptide

<400> SEQUENCE: 161

Thr Val Arg Cys Arg Ile Gly His Met Arg
1               5                   10

<210> SEQ ID NO 162
<211> LENGTH: 10
<212> TYPE: PRT
<213> ORGANISM: Artificial Sequence
<220> FEATURE:
<223> OTHER INFORMATION: Designed peptide

<400> SEQUENCE: 162

Tyr Lys Ile Arg Thr Arg Arg Thr Lys Arg
1               5                   10

<210> SEQ ID NO 163
<211> LENGTH: 10
<212> TYPE: PRT
<213> ORGANISM: Artificial Sequence
```

```
<220> FEATURE:
<223> OTHER INFORMATION: Designed peptide

<400> SEQUENCE: 163

Ser Val Met Val Thr Arg Ser Leu Phe Gly
1               5                   10

<210> SEQ ID NO 164
<211> LENGTH: 10
<212> TYPE: PRT
<213> ORGANISM: Artificial Sequence
<220> FEATURE:
<223> OTHER INFORMATION: Designed peptide

<400> SEQUENCE: 164

Ser Phe Val Lys Gly Pro Ser Arg Gly Ile
1               5                   10

<210> SEQ ID NO 165
<211> LENGTH: 10
<212> TYPE: PRT
<213> ORGANISM: Artificial Sequence
<220> FEATURE:
<223> OTHER INFORMATION: Designed peptide

<400> SEQUENCE: 165

Gly Ser Arg His Lys Asn Leu Ile Ile Pro
1               5                   10

<210> SEQ ID NO 166
<211> LENGTH: 10
<212> TYPE: PRT
<213> ORGANISM: Artificial Sequence
<220> FEATURE:
<223> OTHER INFORMATION: Designed peptide

<400> SEQUENCE: 166

Ile Gly Ser Arg Thr Gly Gly Phe Ile Gly
1               5                   10

<210> SEQ ID NO 167
<211> LENGTH: 10
<212> TYPE: PRT
<213> ORGANISM: Artificial Sequence
<220> FEATURE:
<223> OTHER INFORMATION: Designed peptide

<400> SEQUENCE: 167

Asp Asp Val Arg Ser Gly Thr Ile Ser Gly
1               5                   10

<210> SEQ ID NO 168
<211> LENGTH: 10
<212> TYPE: PRT
<213> ORGANISM: Artificial Sequence
<220> FEATURE:
<223> OTHER INFORMATION: Designed peptide

<400> SEQUENCE: 168

Val Thr Phe Arg Asn Ser Gly Arg Thr Gln
1               5                   10

<210> SEQ ID NO 169
<211> LENGTH: 10
<212> TYPE: PRT
<213> ORGANISM: Artificial Sequence
<220> FEATURE:
```

```
<223> OTHER INFORMATION: Designed peptide

<400> SEQUENCE: 169

Ser Leu Gln His Ser Thr Thr Gly Cys Arg
1               5                   10

<210> SEQ ID NO 170
<211> LENGTH: 10
<212> TYPE: PRT
<213> ORGANISM: Artificial Sequence
<220> FEATURE:
<223> OTHER INFORMATION: Designed peptide

<400> SEQUENCE: 170

Gly Thr Asp Thr Phe His Arg Ser Arg Ala
1               5                   10

<210> SEQ ID NO 171
<211> LENGTH: 10
<212> TYPE: PRT
<213> ORGANISM: Artificial Sequence
<220> FEATURE:
<223> OTHER INFORMATION: Designed peptide

<400> SEQUENCE: 171

Gly Val Ile Ala Gly Ser Gly His Asp Leu
1               5                   10

<210> SEQ ID NO 172
<211> LENGTH: 10
<212> TYPE: PRT
<213> ORGANISM: Artificial Sequence
<220> FEATURE:
<223> OTHER INFORMATION: Designed peptide

<400> SEQUENCE: 172

Gly Cys Val Gly Asp Leu Tyr Cys Ser Ala
1               5                   10

<210> SEQ ID NO 173
<211> LENGTH: 10
<212> TYPE: PRT
<213> ORGANISM: Artificial Sequence
<220> FEATURE:
<223> OTHER INFORMATION: Designed peptide

<400> SEQUENCE: 173

Cys Arg Pro Gly Val Arg Leu Gly Ile Phe
1               5                   10

<210> SEQ ID NO 174
<211> LENGTH: 10
<212> TYPE: PRT
<213> ORGANISM: Artificial Sequence
<220> FEATURE:
<223> OTHER INFORMATION: Designed peptide

<400> SEQUENCE: 174

Val Arg Thr His Trp Phe Gly Ser Ser Arg
1               5                   10

<210> SEQ ID NO 175
<211> LENGTH: 10
<212> TYPE: PRT
<213> ORGANISM: Artificial Sequence
<220> FEATURE:
<223> OTHER INFORMATION: Designed peptide
```

<400> SEQUENCE: 175

Thr Gly Pro Ile Arg Asp His Ser Ser Leu
1               5                   10

<210> SEQ ID NO 176
<211> LENGTH: 10
<212> TYPE: PRT
<213> ORGANISM: Artificial Sequence
<220> FEATURE:
<223> OTHER INFORMATION: Designed peptide

<400> SEQUENCE: 176

Val Gly Arg Ala Ser Arg Trp His Ile Ser
1               5                   10

<210> SEQ ID NO 177
<211> LENGTH: 10
<212> TYPE: PRT
<213> ORGANISM: Artificial Sequence
<220> FEATURE:
<223> OTHER INFORMATION: Designed peptide

<400> SEQUENCE: 177

Thr Thr Ser Trp Gly Val Val Asp Ser Phe
1               5                   10

<210> SEQ ID NO 178
<211> LENGTH: 10
<212> TYPE: PRT
<213> ORGANISM: Artificial Sequence
<220> FEATURE:
<223> OTHER INFORMATION: Designed peptide

<400> SEQUENCE: 178

Thr Val Arg Ser Leu Gly Ile Thr Ser Val
1               5                   10

<210> SEQ ID NO 179
<211> LENGTH: 10
<212> TYPE: PRT
<213> ORGANISM: Artificial Sequence
<220> FEATURE:
<223> OTHER INFORMATION: Designed peptide

<400> SEQUENCE: 179

Ser Lys Gly Arg His Ala Lys Arg Asn His
1               5                   10

<210> SEQ ID NO 180
<211> LENGTH: 10
<212> TYPE: PRT
<213> ORGANISM: Artificial Sequence
<220> FEATURE:
<223> OTHER INFORMATION: Designed peptide

<400> SEQUENCE: 180

Arg Ile Asp His Ser Val His Gly Ile Leu
1               5                   10

<210> SEQ ID NO 181
<211> LENGTH: 10
<212> TYPE: PRT
<213> ORGANISM: Artificial Sequence
<220> FEATURE:
<223> OTHER INFORMATION: Designed peptide -continued

<400> SEQUENCE: 181

Asn Val Ser His Ser Val Arg Lys Pro Ile
1               5                   10

<210> SEQ ID NO 182
<211> LENGTH: 10
<212> TYPE: PRT
<213> ORGANISM: Artificial Sequence
<220> FEATURE:
<223> OTHER INFORMATION: Designed peptide

<400> SEQUENCE: 182

Arg Arg Ile Asp Asp Arg Ile Leu Gly Thr
1               5                   10

<210> SEQ ID NO 183
<211> LENGTH: 10
<212> TYPE: PRT
<213> ORGANISM: Artificial Sequence
<220> FEATURE:
<223> OTHER INFORMATION: Designed peptide

<400> SEQUENCE: 183

Gly Ser Ser Cys Val Glu Thr Asp Gly His
1               5                   10

<210> SEQ ID NO 184
<211> LENGTH: 10
<212> TYPE: PRT
<213> ORGANISM: Artificial Sequence
<220> FEATURE:
<223> OTHER INFORMATION: Designed peptide

<400> SEQUENCE: 184

Cys Trp Gly Ile Lys Arg Thr Ser Ile Ala
1               5                   10

<210> SEQ ID NO 185
<211> LENGTH: 10
<212> TYPE: PRT
<213> ORGANISM: Artificial Sequence
<220> FEATURE:
<223> OTHER INFORMATION: Designed peptide

<400> SEQUENCE: 185

Glu Ser Asn Gly Leu His Leu Pro Leu Arg
1               5                   10

<210> SEQ ID NO 186
<211> LENGTH: 50
<212> TYPE: DNA
<213> ORGANISM: Artificial Sequence
<220> FEATURE:
<223> OTHER INFORMATION: Synthetic oligonucleotide

<400> SEQUENCE: 186
cagacgtgtg ctcttccgat ctgatatcag atcggaagag cgtcgttaag          50

<210> SEQ ID NO 187
<211> LENGTH: 33
<212> TYPE: DNA
<213> ORGANISM: Artificial Sequence
<220> FEATURE:
<223> OTHER INFORMATION: Synthetic oligonucleotide

<400> SEQUENCE: 187
catcacaagt ttgtacaaaa aagcaggctg tga                                33

<210> SEQ ID NO 188
<211> LENGTH: 30
<212> TYPE: DNA
<213> ORGANISM: Artificial Sequence
<220> FEATURE:
<223> OTHER INFORMATION: Synthetic oligonucleotide

<400> SEQUENCE: 188
tatcaccact ttgtacaaga aagctgggtt                                    30

<210> SEQ ID NO 189
<211> LENGTH: 31
<212> TYPE: DNA
<213> ORGANISM: Artificial Sequence
<220> FEATURE:
<223> OTHER INFORMATION: Synthetic oligonucleotide

<400> SEQUENCE: 189
atcacaagtt tgtactggga gggcgatcgc a                                  31

<210> SEQ ID NO 190
<211> LENGTH: 30
<212> TYPE: DNA
<213> ORGANISM: Artificial Sequence
<220> FEATURE:
<223> OTHER INFORMATION: Synthetic oligonucleotide

<400> SEQUENCE: 190
ctatcaccac tttgttcgct acctcgcgaa                                    30

<210> SEQ ID NO 191
<211> LENGTH: 28
<212> TYPE: DNA
<213> ORGANISM: Artificial Sequence
<220> FEATURE:
<223> OTHER INFORMATION: Synthetic oligonucleotide

<400> SEQUENCE: 191
acaagtggtg atagcttgtc gagaagta                                      28

<210> SEQ ID NO 192
<211> LENGTH: 29
<212> TYPE: DNA
<213> ORGANISM: Artificial Sequence
<220> FEATURE:
<223> OTHER INFORMATION: Synthetic oligonucleotide

<400> SEQUENCE: 192
gtacaaactt gtgatgatcc gcgcccgat                                     29

<210> SEQ ID NO 193
<211> LENGTH: 103
<212> TYPE: DNA
<213> ORGANISM: Artificial Sequence
<220> FEATURE:
<223> OTHER INFORMATION: Synthetic oligonucleotide

<400> SEQUENCE: 193 cccccaaataa tgattttatt ttgactgata gtgacctgtt cgttgcaaca aattgatgag  60
caatgctttt ttataatgcc aactttgtac aaaaaagcag gct                    103

<210> SEQ ID NO 194
<211> LENGTH: 105

```
<212> TYPE: DNA
<213> ORGANISM: Artificial Sequence
<220> FEATURE:
<223> OTHER INFORMATION: Synthetic oligonucleotide

<400> SEQUENCE: 194
agcttaccca gctttcttgt acaaagttgg cattataaga aagcattgct tatcaatttg    60
ttgcaacgaa caggtcacta tcagtcaaaa taaaatcatt atttg                   105

<210> SEQ ID NO 195
<211> LENGTH: 217
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (124)..(125)
<223> OTHER INFORMATION: n is a, c, g, or t
<220> FEATURE:
<221> NAME/KEY: misc_feature
<222> LOCATION: (126)..(126)
<223> OTHER INFORMATION: n is c, g, or t
<220> FEATURE:
<221> NAME/KEY: misc_feature
<222> LOCATION: (127)..(128)
<223> OTHER INFORMATION: n is a, c, g, or t
<220> FEATURE:
<221> NAME/KEY: misc_feature
<222> LOCATION: (129)..(129)
<223> OTHER INFORMATION: n is c, g, or t
<220> FEATURE:
<221> NAME/KEY: misc_feature
<222> LOCATION: (130)..(131)
<223> OTHER INFORMATION: n is a, c, g, or t
<220> FEATURE:
<221> NAME/KEY: misc_feature
<222> LOCATION: (132)..(132)
<223> OTHER INFORMATION: n is c, g, or t
<220> FEATURE:
<221> NAME/KEY: misc_feature
<222> LOCATION: (133)..(134)
<223> OTHER INFORMATION: n is a, c, g, or t
<220> FEATURE:
<221> NAME/KEY: misc_feature
<222> LOCATION: (135)..(135)
<223> OTHER INFORMATION: n is c, g, or t
<220> FEATURE:
<221> NAME/KEY: misc_feature
<222> LOCATION: (136)..(137)
<223> OTHER INFORMATION: n is a, c, g, or t
<220> FEATURE:
<221> NAME/KEY: misc_feature
<222> LOCATION: (138)..(138)
<223> OTHER INFORMATION: n is c, g, or t
<220> FEATURE:
<221> NAME/KEY: misc_feature
<222> LOCATION: (139)..(140)
<223> OTHER INFORMATION: n is a, c, g, or t
<220> FEATURE:
<221> NAME/KEY: misc_feature
<222> LOCATION: (141)..(141)
<223> OTHER INFORMATION: n is c, g, or t
<220> FEATURE:
<221> NAME/KEY: misc_feature
<222> LOCATION: (142)..(143)
<223> OTHER INFORMATION: n is a, c, g, or t
<220> FEATURE:
<221> NAME/KEY: misc_feature
<222> LOCATION: (144)..(144)
<223> OTHER INFORMATION: n is c, g, or t
<220> FEATURE:
<221> NAME/KEY: misc_feature
<222> LOCATION: (145)..(146)
<223> OTHER INFORMATION: n is a, c, g, or t
<220> FEATURE:
```

```
<221> NAME/KEY: misc_feature
<222> LOCATION: (147)..(147)
<223> OTHER INFORMATION: n is c, g, or t
<220> FEATURE:
<221> NAME/KEY: misc_feature
<222> LOCATION: (148)..(149)
<223> OTHER INFORMATION: n is a, c, g, or t
<220> FEATURE:
<221> NAME/KEY: misc_feature
<222> LOCATION: (150)..(150)
<223> OTHER INFORMATION: n is c, g, or t
<220> FEATURE:
<221> NAME/KEY: misc_feature
<222> LOCATION: (151)..(152)
<223> OTHER INFORMATION: n is a, c, g, or t
<220> FEATURE:
<221> NAME/KEY: misc_feature
<222> LOCATION: (153)..(153)
<223> OTHER INFORMATION: n is c, g, or t

<400> SEQUENCE: 195
gatcccgcga aattaatacg actcactata ggggaagtat ttttacaaca attaccaaca      60
acaacaacaa acaacaacaa cattacattt tacattctac aactacaagc caccatgggc    120
tgcnnnnnnn nnnnnnnnnn nnnnnnnnnn nnntgcgggg gaggcagcca tcatcatcat    180
catcacggcg gaagcaggac gggggggcggc gtggaaa                            217

<210> SEQ ID NO 196
<211> LENGTH: 117
<212> TYPE: DNA
<213> ORGANISM: Artificial Sequence
<220> FEATURE:
<223> OTHER INFORMATION: Synthetic oligonucleotide

<400> SEQUENCE: 196
gatcccgcga aattaatacg actcactata ggggaagtat ttttacaaca attaccaaca      60
acaacaacaa acaacaacaa cattacattt tacattctac aactacaagc caccatg       117

<210> SEQ ID NO 197
<211> LENGTH: 78
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (26)..(27)
<223> OTHER INFORMATION: n is a, c, g, or t
<220> FEATURE:
<221> NAME/KEY: misc_feature
<222> LOCATION: (28)..(28)
<223> OTHER INFORMATION: n is c, g, or t
<220> FEATURE:
<221> NAME/KEY: misc_feature
<222> LOCATION: (29)..(30)
<223> OTHER INFORMATION: n is a, c, g, or t
<220> FEATURE:
<221> NAME/KEY: misc_feature
<222> LOCATION: (31)..(31)
<223> OTHER INFORMATION: n is c, g, or t
<220> FEATURE:
<221> NAME/KEY: misc_feature
<222> LOCATION: (32)..(33)
<223> OTHER INFORMATION: n is a, c, g, or t
<220> FEATURE:
<221> NAME/KEY: misc_feature
<222> LOCATION: (34)..(34)
<223> OTHER INFORMATION: n is c, g, or t
<220> FEATURE:
<221> NAME/KEY: misc_feature
<222> LOCATION: (35)..(36)
<223> OTHER INFORMATION: n is a, c, g, or t
```

```
<220> FEATURE:
<221> NAME/KEY: misc_feature
<222> LOCATION: (37)..(37)
<223> OTHER INFORMATION: n is c, g, or t
<220> FEATURE:
<221> NAME/KEY: misc_feature
<222> LOCATION: (38)..(39)
<223> OTHER INFORMATION: n is a, c, g, or t
<220> FEATURE:
<221> NAME/KEY: misc_feature
<222> LOCATION: (40)..(40)
<223> OTHER INFORMATION: n is c, g, or t
<220> FEATURE:
<221> NAME/KEY: misc_feature
<222> LOCATION: (41)..(42)
<223> OTHER INFORMATION: n is a, c, g, or t
<220> FEATURE:
<221> NAME/KEY: misc_feature
<222> LOCATION: (43)..(43)
<223> OTHER INFORMATION: n is c, g, or t
<220> FEATURE:
<221> NAME/KEY: misc_feature
<222> LOCATION: (44)..(45)
<223> OTHER INFORMATION: n is a, c, g, or t
<220> FEATURE:
<221> NAME/KEY: misc_feature
<222> LOCATION: (46)..(46)
<223> OTHER INFORMATION: n is c, g, or t
<220> FEATURE:
<221> NAME/KEY: misc_feature
<222> LOCATION: (47)..(48)
<223> OTHER INFORMATION: n is a, c, g, or t
<220> FEATURE:
<221> NAME/KEY: misc_feature
<222> LOCATION: (49)..(49)
<223> OTHER INFORMATION: n is c, g, or t
<220> FEATURE:
<221> NAME/KEY: misc_feature
<222> LOCATION: (50)..(51)
<223> OTHER INFORMATION: n is a, c, g, or t
<220> FEATURE:
<221> NAME/KEY: misc_feature
<222> LOCATION: (52)..(52)
<223> OTHER INFORMATION: n is c, g, or t
<220> FEATURE:
<221> NAME/KEY: misc_feature
<222> LOCATION: (53)..(54)
<223> OTHER INFORMATION: n is a, c, g, or t
<220> FEATURE:
<221> NAME/KEY: misc_feature
<222> LOCATION: (55)..(55)
<223> OTHER INFORMATION: n is c, g, or t

<400> SEQUENCE: 197
acaactacaa gccaccatgg gctgcnnnnn nnnnnnnnnn nnnnnnnnnn nnnnntgcgg      60
gggaggcagc catcatca                                                  78

<210> SEQ ID NO 198
<211> LENGTH: 61
<212> TYPE: DNA
<213> ORGANISM: Artificial Sequence
<220> FEATURE:
<223> OTHER INFORMATION: Synthetic oligonucleotide

<400> SEQUENCE: 198
tttccacgcc gccccccgtc ctgcttccgc cgtgatgatg atgatgatgg ctgcctcccc      60
c                                                                    61

<210> SEQ ID NO 199
<211> LENGTH: 26
<212> TYPE: DNA
<213> ORGANISM: Artificial Sequence
<220> FEATURE:
```

```
<223> OTHER INFORMATION: Synthetic oligonucleotide
<220> FEATURE:
<221> NAME/KEY: misc_feature
<222> LOCATION: (1)..(1)
<223> OTHER INFORMATION: Biotin-TEG-dA
<220> FEATURE:
<221> NAME/KEY: misc_feature
<222> LOCATION: (3)..(3)
<223> OTHER INFORMATION: riboguanine
<220> FEATURE:
<221> NAME/KEY: misc_feature
<222> LOCATION: (12)..(12)
<223> OTHER INFORMATION: 3-Cyanovinylcarbazole-dG
<220> FEATURE:
<221> NAME/KEY: misc_feature
<222> LOCATION: (23)..(23)
<223> OTHER INFORMATION: Amino C6-dT

<400> SEQUENCE: 199
nanaatttcc anccgccccc cgncct                                          26

<210> SEQ ID NO 200
<211> LENGTH: 60
<212> TYPE: DNA
<213> ORGANISM: Artificial Sequence
<220> FEATURE:
<223> OTHER INFORMATION: Synthetic oligonucleotide

<400> SEQUENCE: 200
gatcccgcga aattaatacg actcactata ggggaagtat ttttacaaca attaccaaca     60

<210> SEQ ID NO 201
<211> LENGTH: 22
<212> TYPE: DNA
<213> ORGANISM: Artificial Sequence
<220> FEATURE:
<223> OTHER INFORMATION: Synthetic oligonucleotide

<400> SEQUENCE: 201
tttccacgcc gcccccgtc ct                                               22

<210> SEQ ID NO 202
<211> LENGTH: 58
<212> TYPE: DNA
<213> ORGANISM: Artificial Sequence
<220> FEATURE:
<223> OTHER INFORMATION: Synthetic oligonucleotide

<400> SEQUENCE: 202
tcgtcggcag cgtcagatgt gtataagaga cagcattcta caactacaag ccaccatg      58

<210> SEQ ID NO 203
<211> LENGTH: 61
<212> TYPE: DNA
<213> ORGANISM: Artificial Sequence
<220> FEATURE:
<223> OTHER INFORMATION: Synthetic oligonucleotide

<400> SEQUENCE: 203
gtctcgtggg ctcggagatg tgtataagag acagtttcca cgccgccccc cgtcctgctt    60
c                                                                    61

<210> SEQ ID NO 204
<211> LENGTH: 47
<212> TYPE: DNA
<213> ORGANISM: Artificial Sequence
<220> FEATURE:
<223> OTHER INFORMATION: Synthetic oligonucleotide
```

<400> SEQUENCE: 204
caagcagaag acggcatacg agatgcgtag tagtctcgtg ggctcgg            47

<210> SEQ ID NO 205
<211> LENGTH: 47
<212> TYPE: DNA
<213> ORGANISM: Artificial Sequence
<220> FEATURE:
<223> OTHER INFORMATION: Synthetic oligonucleotide

<400> SEQUENCE: 205
caagcagaag acggcatacg agatcggagc ctgtctcgtg ggctcgg            47

<210> SEQ ID NO 206
<211> LENGTH: 51
<212> TYPE: DNA
<213> ORGANISM: Artificial Sequence
<220> FEATURE:
<223> OTHER INFORMATION: Synthetic oligonucleotide

<400> SEQUENCE: 206
aatgatacgg cgaccaccga gatctacact ctctccgtcg tcggcagcgt c       51

<210> SEQ ID NO 207
<211> LENGTH: 51
<212> TYPE: DNA
<213> ORGANISM: Artificial Sequence
<220> FEATURE:
<223> OTHER INFORMATION: Synthetic oligonucleotide

<400> SEQUENCE: 207
aatgatacgg cgaccaccga gatctacacc gtctaattcg tcggcagcgt c       51

<210> SEQ ID NO 208
<211> LENGTH: 40
<212> TYPE: DNA
<213> ORGANISM: Artificial Sequence
<220> FEATURE:
<223> OTHER INFORMATION: Synthetic oligonucleotide
<220> FEATURE:
<221> NAME/KEY: misc_feature
<222> LOCATION: (1)..(1)
<223> OTHER INFORMATION: Biotin-TEG-dA
<220> FEATURE:
<221> NAME/KEY: misc_feature
<222> LOCATION: (21)..(21)
<223> OTHER INFORMATION: deoxyinosine
<220> FEATURE:
<221> NAME/KEY: misc_feature
<222> LOCATION: (27)..(27)
<223> OTHER INFORMATION: 3-Cyanovinylcarbazole-dG
<220> FEATURE:
<221> NAME/KEY: misc_feature
<222> LOCATION: (38)..(38)
<223> OTHER INFORMATION: Amino C6-dT

<400> SEQUENCE: 208
naaaaaaaaa aaaaaaaaaa nttccanccg cccccgnct                    40